United States Patent
Roth et al.

(10) Patent No.: US 11,689,640 B2
(45) Date of Patent: Jun. 27, 2023

(54) FLEXIBLE MULTI-ACCESS EDGE COMPUTING (MEC) SERVICES CONSUMPTION THROUGH HOSTS ZONING

(71) Applicant: Intel Corporation, Santa Clara, CA (US)

(72) Inventors: Kilian Peter Anton Roth, Munich (DE); Dario Sabella, Gassino (DE); Miltiadis Filippou, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/957,697

(22) PCT Filed: Dec. 28, 2018

(86) PCT No.: PCT/US2018/067898
§ 371 (c)(1),
(2) Date: Jun. 24, 2020

(87) PCT Pub. No.: WO2019/199362
PCT Pub. Date: Oct. 17, 2019

(65) Prior Publication Data
US 2021/0067605 A1 Mar. 4, 2021

Related U.S. Application Data

(60) Provisional application No. 62/656,138, filed on Apr. 11, 2018.

(51) Int. Cl.
*H04L 67/61* (2022.01)
*H04L 41/5009* (2022.01)
(Continued)

(52) U.S. Cl.
CPC .......... *H04L 67/61* (2022.05); *H04L 41/5009* (2013.01); *H04L 67/1095* (2013.01); *H04L 67/63* (2022.05)

(58) Field of Classification Search
None
See application file for complete search history.

(56) References Cited

U.S. PATENT DOCUMENTS

| 8,751,613 B1* | 6/2014 | Medved | H04L 47/10 370/229 |
| 2019/0020657 A1* | 1/2019 | Egner | G06Q 20/3224 |
| 2020/0366732 A1* | 11/2020 | Trang | H04L 67/1021 |

FOREIGN PATENT DOCUMENTS

| DE | 112018007463 | 12/2020 |
| EP | 3404885 A1 | 11/2018 |

(Continued)

OTHER PUBLICATIONS

"International Application Serial No. PCT/US2018/067898, International Search Report dated Apr. 11, 2019", 4 pgs.

(Continued)

*Primary Examiner* — Kevin S Mai
(74) *Attorney, Agent, or Firm* — Schwegman Lundberg & Woessner, P.A.

(57) ABSTRACT

Systems and methods for establishing, configuring, and operating multi-access edge computing (MEC) services and service consumption through zoning hosts in multi-vendor or multi-system environments. An apparatus operating as a MEC orchestrator to manage services consumption using zones is configurable to perform operations to: receive, from an application executing at a host, a request for a list of services and corresponding proximity zones; in response to receiving the request for the list of services, query a plurality of hosts for performance metrics of respective services offered from the plurality of hosts, the respective services to be used by the application executing at the host; construct a zone map, the zone map maintaining a mapping between the application and the plurality of hosts based on the performance metrics; and manage migration of the application or (Continued)

a service of the respective services, based on the zone map, to ensure QoS of the application.

17 Claims, 18 Drawing Sheets

(51) Int. Cl.
*H04L 67/1095* (2022.01)
*H04L 67/63* (2022.01)

(56) References Cited

FOREIGN PATENT DOCUMENTS

| WO | WO-2017100640 A1 | 6/2017 |
| WO | WO-2017132951 A1 | 8/2017 |
| WO | WO-2019199362 A1 | 10/2019 |

OTHER PUBLICATIONS

"International Application Serial No. PCT/US2018/067898, Written Opinion dated Apr. 11, 2019", 7 pgs.
"International Application Serial No. PCT US2018 067898, International Preliminary Report on Patentability dated Oct. 22, 2020", 9 pgs.

\* cited by examiner

FLEXIBLE MULTI-ACCESS EDGE COMPUTING (MEC) SERVICES CONSUMPTION THROUGH HOSTS ZONING

PRIORITY CLAIM

This application is a U.S. National Stage Application under 35 U.S.C. 371 from International Application No. PCT/US2018/067898, filed Dec. 28, 2018, published as WO 2019/199362, which claims the benefit of priority to U.S. Application Ser. No. 62/656,138, filed Apr. 11, 2018, all of which are incorporated herein by reference in their entirety.

TECHNICAL FIELD

Embodiments described herein generally relate to data processing and communication system implementations, and in particular, to techniques for establishing and implementing services in multi-access edge computing (MEC) and Internet of Things (IoT) device networks.

BACKGROUND

IoT devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Multi-access Edge Computing (MEC) offers application developers and content providers cloud-computing capabilities and an IT service environment at the edge of the network. This environment is characterized by ultra-low latency and high bandwidth as well as real-time access to radio network information that may be leveraged by applications. MEC technology permits to flexibly and rapidly deploy innovative applications and services towards mobile subscribers, enterprises and vertical segments.

The deployment of IoT devices and MEC services have introduced a number of advanced use cases and scenarios occurring at the edge of the network. However, these advanced use cases have also introduced a number of corresponding technical challenges relating to security, processing and network resources, service availability and efficiency, among many other issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
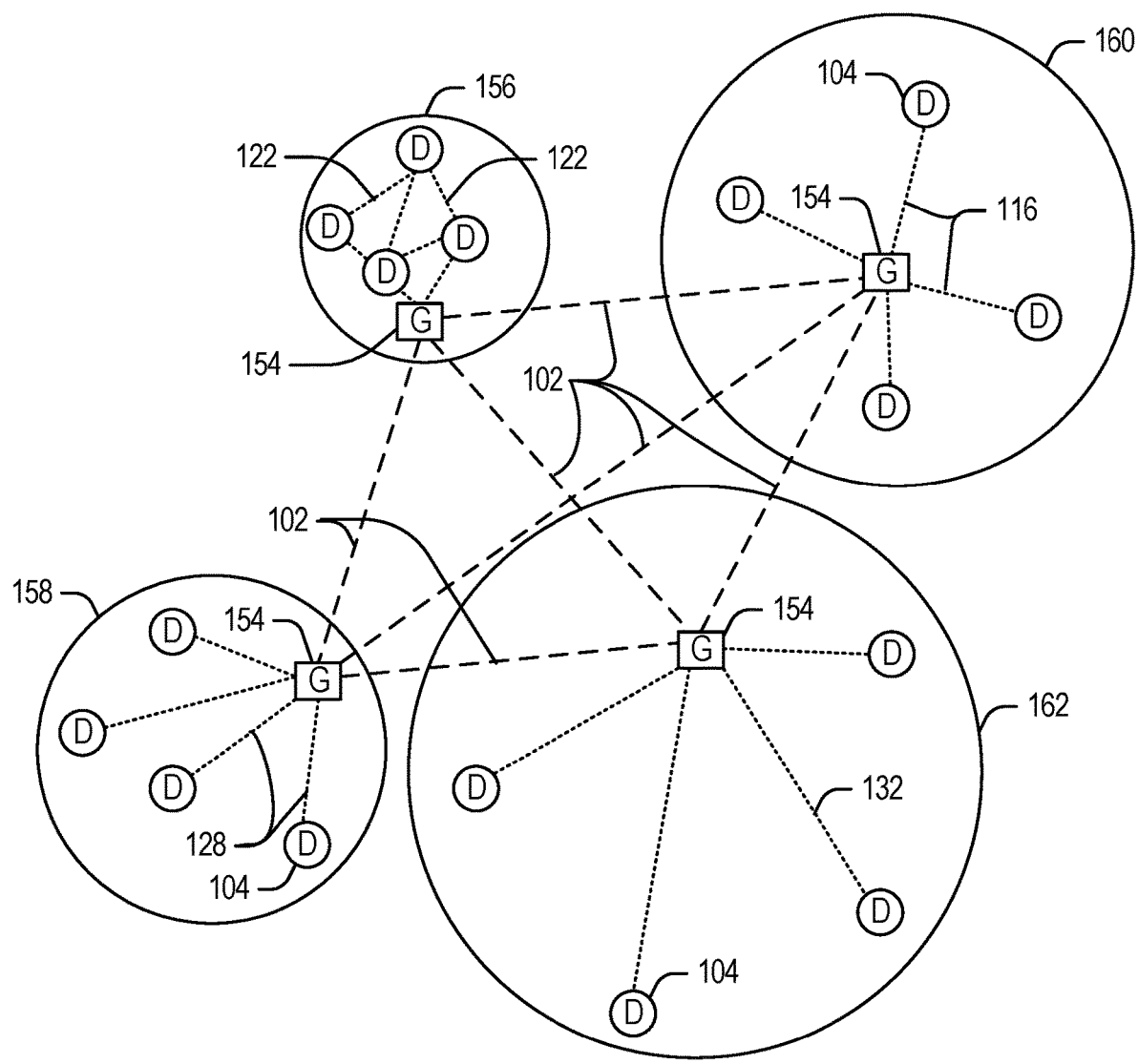
FIG. 1 illustrates a domain topology for respective Internet-of-Things (IoT) networks, according to an example.

In the following description, methods, configurations, and related apparatuses are disclosed for configuring and utilizing Multi-access Edge Computing (MEC) services in cloud edge-based scenarios. In various examples, the presently disclosed techniques provide MEC enhancements that enable a flexible usage of MEC platform services consumption locally, in remote MEC hosts of the MEC system, or across different MEC systems. Further, the presently disclosed techniques introduce a definition of QoS/cost-aware proximity zones around MEC servers and service-producing MEC application instances. Additionally, the presently disclosed techniques introduce a signaling protocol among the involved MEC entities for QoS/cost-efficient MEC service consumption by a MEC app, taking into account the defined proximity zones.

In this disclosure, proximity zones, using the MEC host hosting a MEC application instant as a reference, may be constructed by the MEC Orchestrator of the reference MEC system via exploiting a statistical model of the zoning utility criterion, e.g., the time elapsed (latency) between a service consumption request and the consumption of a needed service instantiated at the same or a different MEC host, the reliability of the service consumption procedure (i.e., the absence of failures/control packet drops), or other analysis.

To verify the validity and timeliness of statistically constructed proximity zones, measurements and real world figures may be used by the MEC Orchestrator, so as to verify or disprove the statistically shaped construction of zones. In case of verification, the used statistical model for proximity zone construction does not need to be updated, since it is accurate enough, given the current system conditions. Should this not be the case, the statistical model (e.g., the Complementary Cumulative Distribution Functions (CCDFs) of the MEC host-to-MEC host delay, exploited by the MEC Orchestrator) needs to be refined or updated, for example, taking more current measurements into account.

The present techniques and configurations may provide significant benefits to MEC architectures and other Internet-of-Things (IoT) device network architectures involving any number of edge computing devices or fog computing platforms. The present techniques and configurations enable a definition of QoS/cost-aware proximity zones around a MEC server hosting a MEC app, to assist the MEC app in deciding whether a candidate MEC service may be directly consumed or not. Conventional deployments of MEC systems and services do not provide the capability to consider flexible and real-world MEC services consumption in multi-vendor environments (e.g., across different MEC systems).

The following disclosure introduces enhancements that may be implemented in the ETSI MEC standard to enable a flexible usage in different network deployments and scenarios. These enhancements include a number of definitions of QoS/cost-aware proximity zones or other logical collections of MEC servers and service-producing MEC application instances. In an example, these techniques include gathering proximity measurements from MEC hosts, classifying the measurements according to a performance/cost criterion, and storing the measurements in an asynchronous fashion at the MEC Orchestrator (MEO). This information enables an implementer to accomplish a QoS/cost-efficient MEC service consumption by a MEC application, as the defined proximity zones are taken into consideration by means of a signaling protocol among the involved MEC entities.

Accordingly, the following proposed techniques may provide benefits to assist Mobile Network Operators (MNOs) in planning the deployment of MEC hosts, as well as in forming MEC service charging policies according to a cost model structured with the aid of the proposed proximity-aware service consumption framework. Also, the definitions of QoS/cost-aware proximity zones for service consumption are useful to MEC app developers (e.g., vertical businesses) because such definitions enable developers to evaluate the popularity of their applications by end customers under QoS provisions. Such development may be extended to create economies of scale, to provide a number of technical benefits and advantages within the operation of communication networks and computing hardware.

The following provides a detailed discussion of these techniques within MEC systems and services, applicable to the larger context of Internet of Things (IoT) and fog network deployments. It will be understood that the disclosed MEC system and service deployment examples provide one illustrative example of a fog device or fog system, operating as a set of one or more interconnected services and systems extended to devices located at the edge of a network. However, the techniques disclosed herein may relate to other IoT standards and configurations, and other intermediate processing entities and architectures.

FIG. 1 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
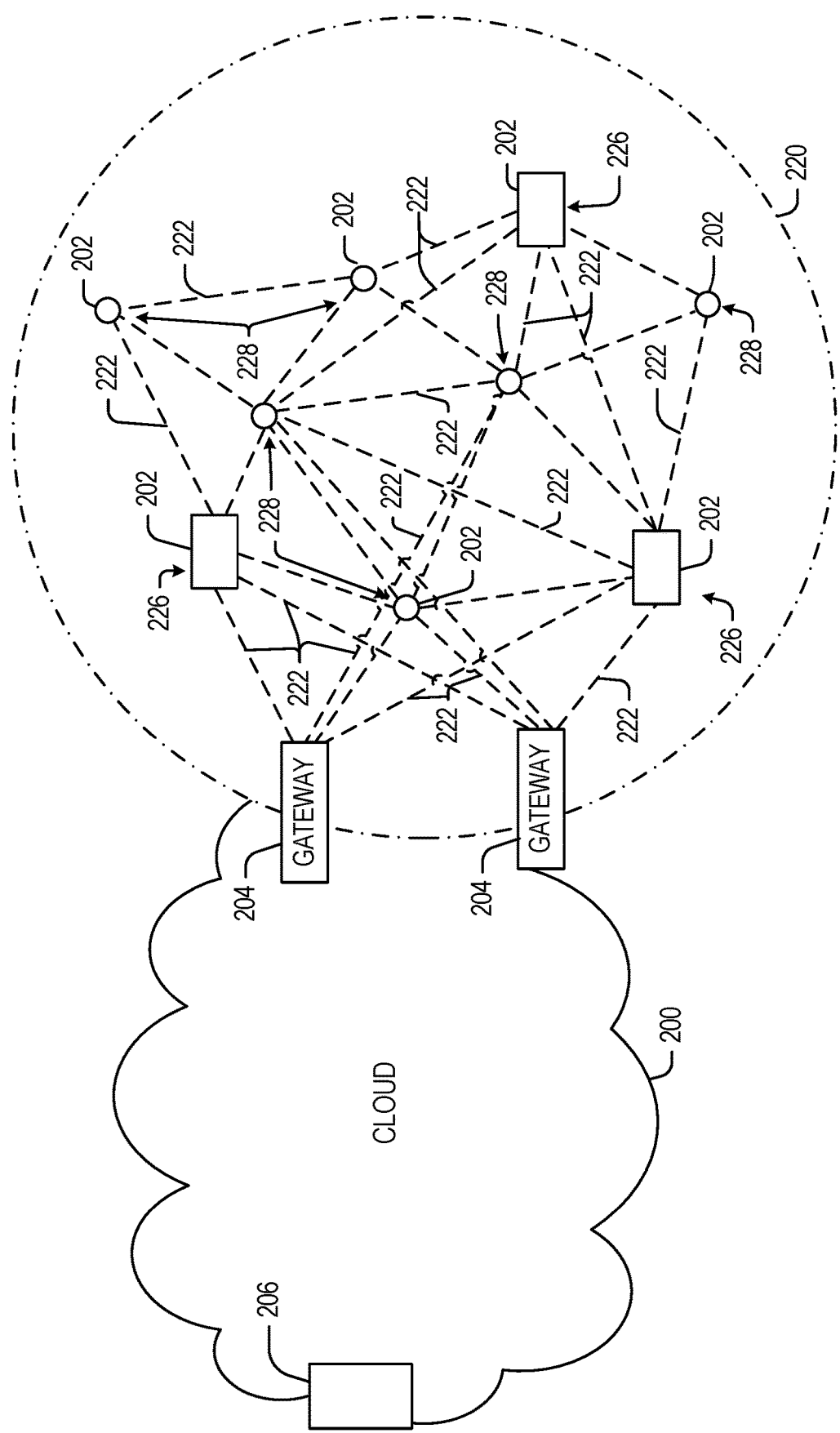
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 3 and 4.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

Figure 3:
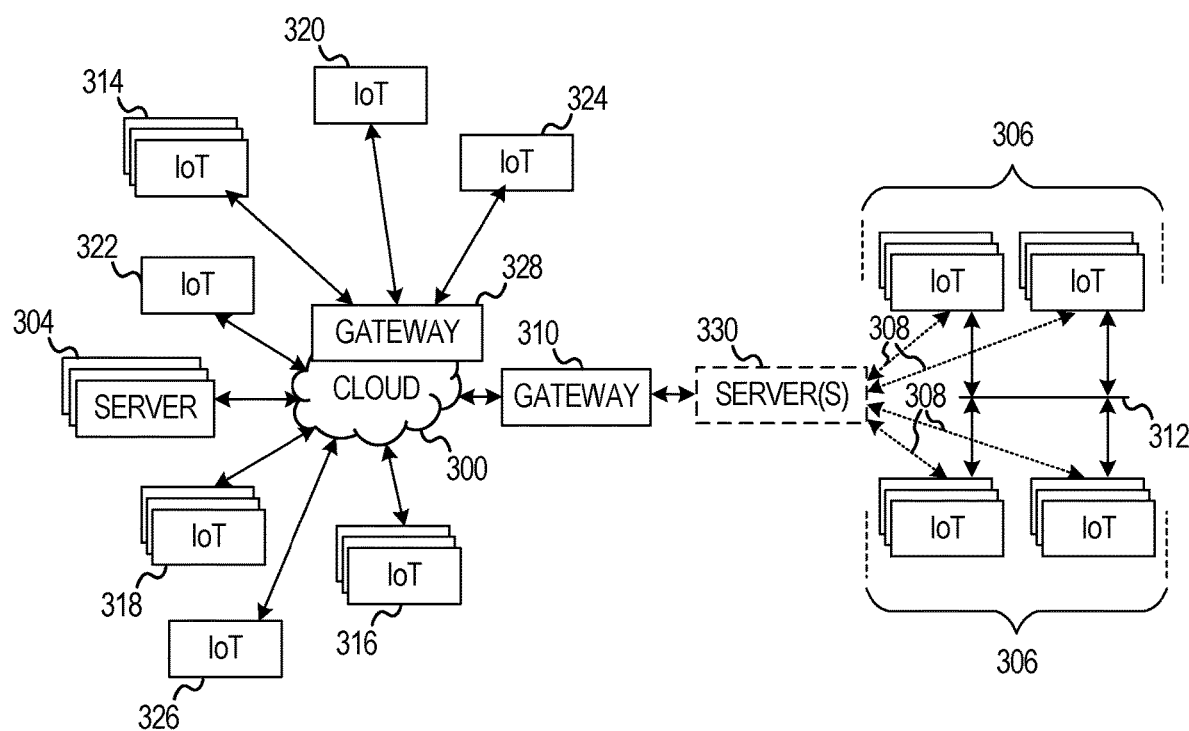
FIG. 3 illustrates a drawing of a cloud computing network, or cloud, in communication with a number of Internet of Things (IoT) devices, according to an example.

FIG. 3 illustrates a drawing of a cloud computing network, or cloud 300, in communication with a number of Internet of Things (IoT) devices. The cloud 300 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 300 through wired or wireless links 308, such as LPWA links, optical links, and the like. Further, a wired or wireless sub-network 312 may allow the IoT devices to communicate with each other, such as through a local area network, a wireless local area network, and the like. The IoT devices may use another device, such as a gateway 310 or 328 to communicate with remote locations such as the cloud 300; the IoT devices may also use one or more servers 330 to facilitate communication with the cloud 300 or with the gateway 310. For example, the one or more servers 330 may operate as an intermediate network node to support a local edge cloud or fog implementation among a local area network. Further, the gateway 328 that is depicted may operate in a cloud-to-gateway-to-many edge devices configuration, such as with the various IoT devices 314, 320, 324 being constrained or dynamic to an assignment and use of resources in the cloud 300.

Other example groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, with another IoT fog device or system, or a combination therein. The groups of IoT devices may be deployed in various residential, commercial, and industrial settings (including in both private or public environments).

As may be seen from FIG. 3, a large number of IoT devices may be communicating through the cloud 300. This may allow different IoT devices to request or provide information to other devices autonomously. For example, a group of IoT devices (e.g., the traffic control group 306) may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 300. This may allow the IoT devices to form an ad-hoc network between the devices, allowing them to function as a single device, which may be termed a fog device or system (e.g., as described above).

Figure 4:
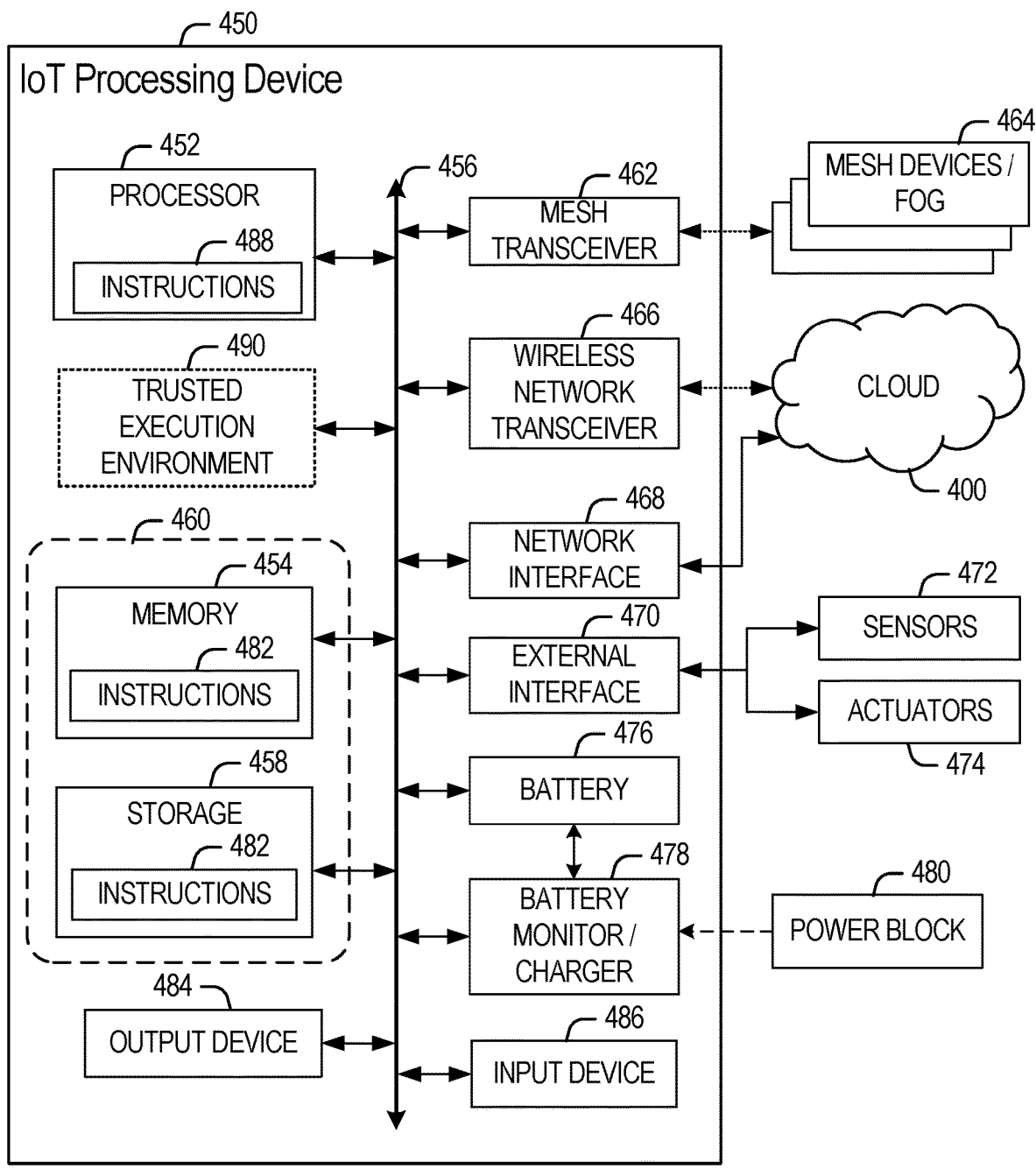
FIG. 4 illustrates a block diagram for an example IoT processing system architecture in which any one or more of the techniques (e.g., operations, processes, methods, and methodologies) discussed herein may be performed, according to an example.

FIG. 4 is a block diagram of an example of components that may be present in an IoT device 450 for implementing the techniques described herein. The IoT device 450 may include any combinations of the components shown in the example or referenced in the disclosure above. The components may be implemented as ICs, portions thereof, discrete electronic devices, or other modules, logic, hardware, software, firmware, or a combination thereof adapted in the IoT device 450, or as components otherwise incorporated within a chassis of a larger system. Additionally, the block diagram of FIG. 4 is intended to depict a high-level view of components of the IoT device 450. However, some of the components shown may be omitted, additional components may be present, and different arrangement of the components shown may occur in other implementations.

The IoT device 450 may include a processor 452, which may be a microprocessor, a multi-core processor, a multi-threaded processor, an ultra-low voltage processor, an embedded processor, or other known processing element. The processor 452 may be a part of a system on a chip (SoC) in which the processor 452 and other components are formed into a single integrated circuit, or a single package, such as the Edison™ or Galileo™ SoC boards from Intel. As an example, the processor 452 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A11 processor from Apple® Inc., a Snapdragon™ processor from Qualcomm® Technologies, Inc., or an OMAP™ processor from Texas Instruments, Inc.

The processor 452 may communicate with a system memory 454 over an interconnect 456 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 458 may also couple to the processor 452 via the interconnect 456. In an example, the storage 458 may be implemented via a solid state disk drive (SSDD). Other devices that may be used for the storage 458 include flash memory cards, such as SD cards, micro SD cards, xD picture cards, and the like, and USB flash drives. In low power implementations, the storage 458 may be on-die memory or registers associated with the processor 452. However, in some examples, the storage 458 may be implemented using a micro hard disk drive (HDD). Further, any number of new technologies may be used for the storage 458 in addition to, or instead of, the technologies described, such resistance change memories, phase change memories, holographic memories, or chemical memories, among others.

The components may communicate over the interconnect 456. The interconnect 456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 456 may be a proprietary bus, for example, used in a SoC based system. Other bus systems may be included, such as an I2C interface, an SPI interface, point to point interfaces, and a power bus, among others.

The interconnect 456 may couple the processor 452 to a mesh transceiver 462, for communications with other mesh devices 464. The mesh transceiver 462 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 464. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 462 may communicate using multiple standards or radios for communications at different range. For example, the IoT device 450 may communicate with close devices, e.g., within about 2 meters, using a local transceiver based on BLE, or another low power radio, to save power. More distant mesh devices 464, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 466 may be included to communicate with devices or services in the cloud 400 via local or wide area network protocols. The wireless network transceiver 466 may be a LPWA transceiver that follows the IEEE 802.15.4, or IEEE 802.15.4g standards, among others. The IoT device 450 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 462 and wireless network transceiver 466, as described herein. For example, the radio transceivers 462 and 466 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 462 and 466 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 466, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 468 may be included to provide a wired communication to the cloud 400 or to other devices, such as the mesh devices 464. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 468 may be included to allow connect to a second network, for example, a NIC 468 providing communications to the cloud over Ethernet, and a second NIC 468 providing communications to other devices over another type of network.

The interconnect 456 may couple the processor 452 to an external interface 470 that is used to connect external devices or subsystems. The external devices may include sensors 472, such as accelerometers, level sensors, flow sensors, optical light sensors, camera sensors, temperature sensors, a global positioning system (GPS) sensors, pressure sensors, barometric pressure sensors, and the like. The external interface 470 further may be used to connect the IoT device 450 to actuators 474, such as power switches, valve actuators, an audible sound generator, a visual warning device, and the like.

In some optional examples, various input/output (I/O) devices may be present within, or connected to, the IoT device 450. For example, a display or other output device 484 may be included to show information, such as sensor readings or actuator position. An input device 486, such as a touch screen or keypad may be included to accept input. An output device 484 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 450.

A battery 476 may power the IoT device 450, although in examples in which the IoT device 450 is mounted in a fixed location, it may have a power supply coupled to an electrical grid. The battery 476 may be a lithium ion battery, or a metal-air battery, such as a zinc-air battery, an aluminum-air battery, a lithium-air battery, and the like.

A battery monitor/charger 478 may be included in the IoT device 450 to track the state of charge (SoCh) of the battery 476. The battery monitor/charger 478 may be used to monitor other parameters of the battery 476 to provide failure predictions, such as the state of health (SoH) and the state of function (SoF) of the battery 476. The battery monitor/charger 478 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 478 may communicate the information on the battery 476 to the processor 452 over the interconnect 456. The battery monitor/charger 478 may also include an analog-to-digital (ADC) convertor that allows the processor 452 to directly monitor the voltage of the battery 476 or the current flow from the battery 476. The battery parameters may be used to determine actions that the IoT device 450 may perform, such as transmission frequency, mesh network operation, sensing frequency, and the like.

A power block 480, or other power supply coupled to a grid, may be coupled with the battery monitor/charger 478 to charge the battery 476. In some examples, the power block 480 may be replaced with a wireless power receiver to obtain the power wirelessly, for example, through a loop antenna in the IoT device 450. A wireless battery charging circuit, such as an LTC4020 chip from Linear Technologies of Milpitas, Calif., among others, may be included in the battery monitor/charger 478. The specific charging circuits chosen depend on the size of the battery 476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 458 may include instructions 482 in the form of software, firmware, or hardware commands to implement the techniques described herein. Although such instructions 482 are shown as code blocks included in the memory 454 and the storage 458, it may be understood that any of the code blocks may be replaced with hardwired circuits, for example, built into an application specific integrated circuit (ASIC).

In an example, the instructions 482 provided via the memory 454, the storage 458, or the processor 452 may be embodied as a non-transitory, machine-readable medium 460 including code to direct the processor 452 to perform electronic operations in the IoT device 450. The processor 452 may access the non-transitory, machine-readable medium 460 over the interconnect 456. For instance, the non-transitory, machine-readable medium 460 may be embodied by devices described for the storage 458 of FIG. 4 or may include specific storage units such as optical disks, flash drives, or any number of other hardware devices. The non-transitory, machine-readable medium 460 may further include, provide, or invoke instructions 488 to direct the processor 452 to perform a specific sequence or flow of actions, for example, as described with respect to the flowchart(s) and block diagram(s) of operations and functionality depicted above.

In an example, the instructions 488 on the processor 452 (separately, or in combination with the instructions 488 of the machine-readable medium 460) may configure execution or operation of a trusted execution environment (TEE) 490. In an example, the TEE 490 operates as a protected area accessible to the processor 452 to enable secure access to data and secure execution of instructions. Various implementations of the TEE 490, and an accompanying secure area in the processor 452 or the memory 454 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 450 through the TEE 490 and the processor 452.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

In various examples, the operations and functionality described herein may be embodied by a machine, or set of machines in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 5:
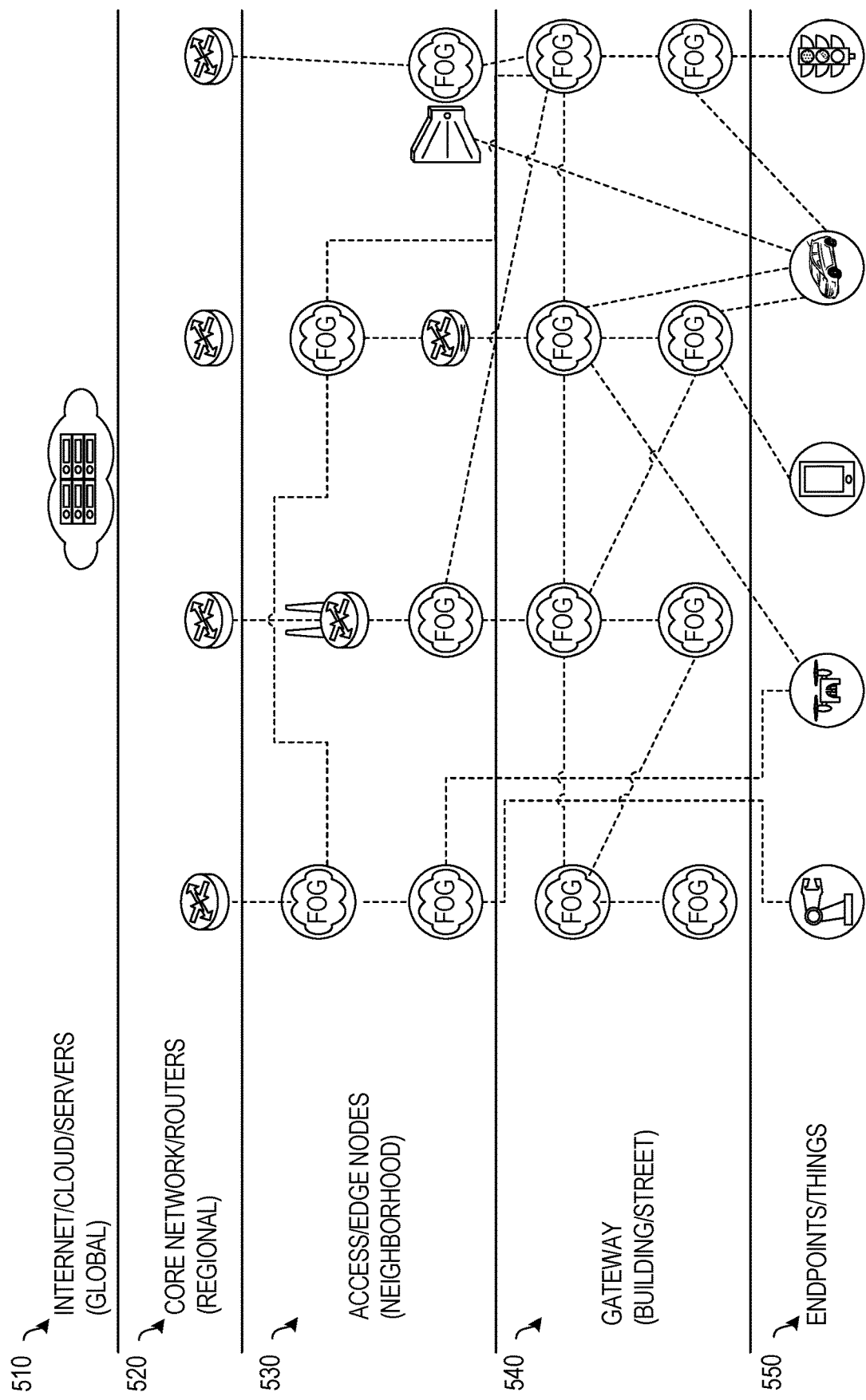
FIG. 5 illustrates a MEC and Fog network topology, according to an example.

FIG. 5 illustrates a MEC and Fog network topology, according to an example. This network topology, which includes a number of conventional networking layers, may be extended through use of the tags and objects discussed herein. Specifically, the relationships between endpoints (at endpoints/things network layer 550), gateways (at gateway layer 540), access or edge computing nodes (e.g., at neighborhood nodes layer 530), core network or routers (e.g., at regional or central office layer 520), may be represented through the use of linked objects and tag properties.

A Fog network (e.g., established at gateway layer 540) may represent a dense geographical distribution of near-user edge devices (e.g., Fog nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 5 illustrates a general architecture that integrates a number of MEC and FOG nodes—categorized in different layers (based on their position, connectivity and processing capabilities, etc.). It will be understood, however, that such Fog nodes may be replaced or augmented by edge computing processing nodes.

Fog nodes may be categorized depending on the topology and the layer where they are located. In contrast, from a MEC standard perspective, each Fog node may be considered as a mobile edge (ME) Host, or a simple entity hosting a ME app and a light-weighted ME Platform. In an example, a MEC or Fog node may be defined as an application instance, connected to or running on a device (ME Host) that is hosting a ME Platform. Here, the application consumes MEC services and is associated to a ME Host in the system. The nodes may be migrated, associated to different ME Hosts, or consume MEC services from other (e.g., local or remote) ME platforms.

In contrast to this approach, traditional client, V2V, and other network applications are reliant on remote cloud data storage and processing to exchange and coordinate information. A cloud data arrangement allows for long-term data collection and storage, but is not optimal for highly time varying data, such as a collision, traffic light change, etc. and may fail in attempting to meet latency challenges, such as stopping a vehicle when a child runs into the street. The data message translation techniques discussed herein enable direct communication to occur among devices (e.g., vehicles) in a low-latency manner, using features in existing MEC services that provide minimal overhead.

Depending on the real-time requirements in the applicable communications context, a hierarchical structure of data processing and storage nodes may be defined. For example, including local ultra-low-latency processing, regional storage and processing as well as remote cloud data-center based storage and processing. SLAs, and KPIs, and other measures discussed herein may be used to identify where data is best transferred and where it is processed or stored. This typically depends on the Open Systems Interconnection (OSI) layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 6:
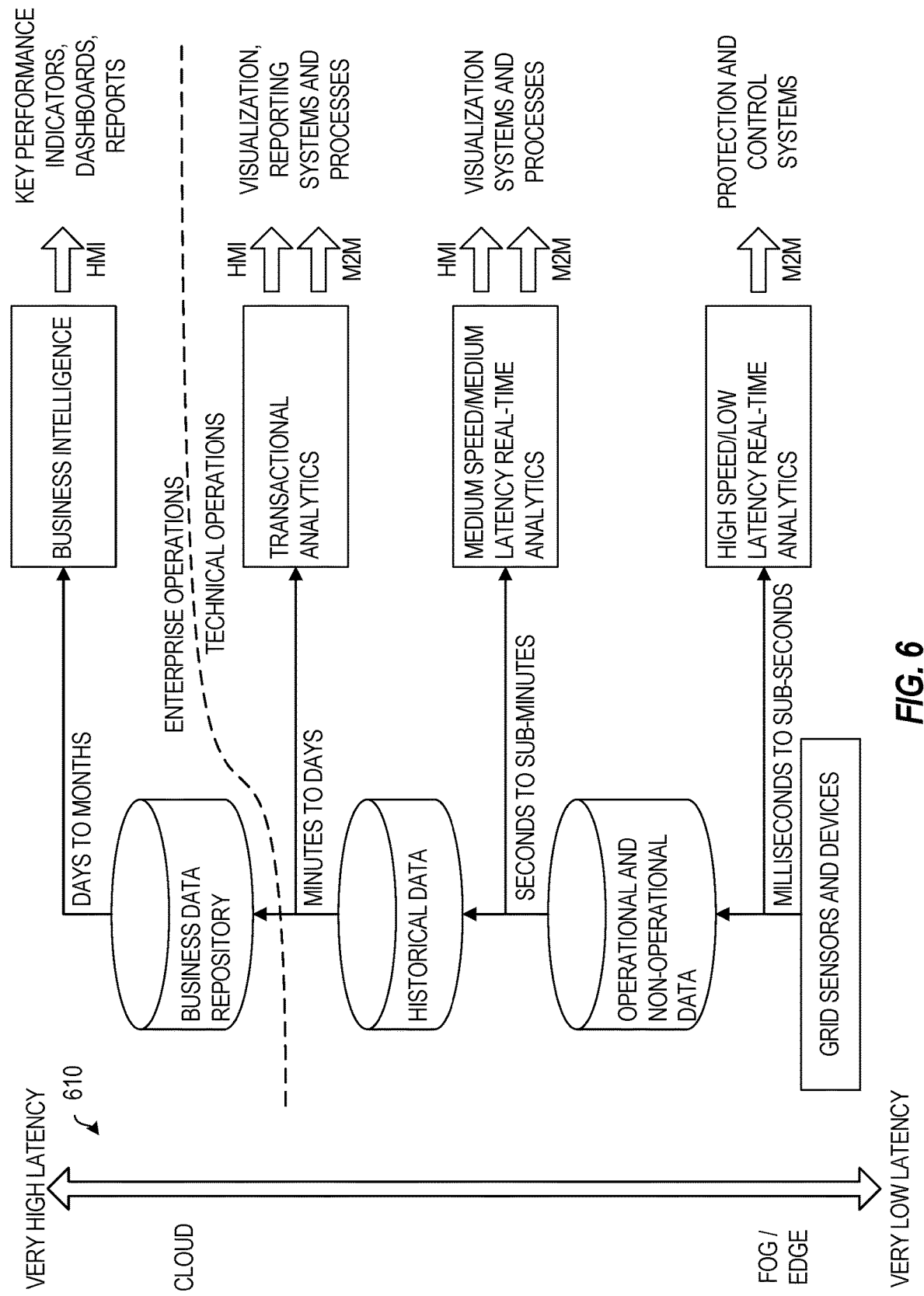
FIG. 6 illustrates processing and storage layers in a MEC and Fog network, according to an example.

FIG. 6 illustrates processing and storage layers in a MEC and Fog network, according to an example. The illustrated data storage or processing hierarchy 610 relative to the cloud and fog/edge networks allows dynamic reconfiguration of elements to meet latency and data processing parameters.

The lowest hierarchy level is on a device-level (e.g., at the vehicle). This level stores data on past observations or data obtained from other devices (e.g., vehicles). The second hierarchy level is distributed storage across a number of devices (e.g., vehicles). This distributed storage may change on short notice depending on proximity to each other or a target location (e.g., near an accident). The third hierarchy level is in a local anchor point, such as a MEC component, e.g., carried by a vehicle in order to coordinate vehicles in a pool of cars. The fourth level of hierarchy is storage shared across MEC components. For example, data is shared between distinct pools of vehicles that are in range of each other.

The fifth level of hierarchy is fixed infrastructure storage, such as in RSUs. This level may aggregate data from entities in hierarchy levels 1-4. The sixth level of hierarchy is storage across fixed infrastructure. This level may, for example, be located in the Core Network of a telecommunications network, or an enterprise cloud. Other types of layers and layer processing may follow from this example.

Figure 7:
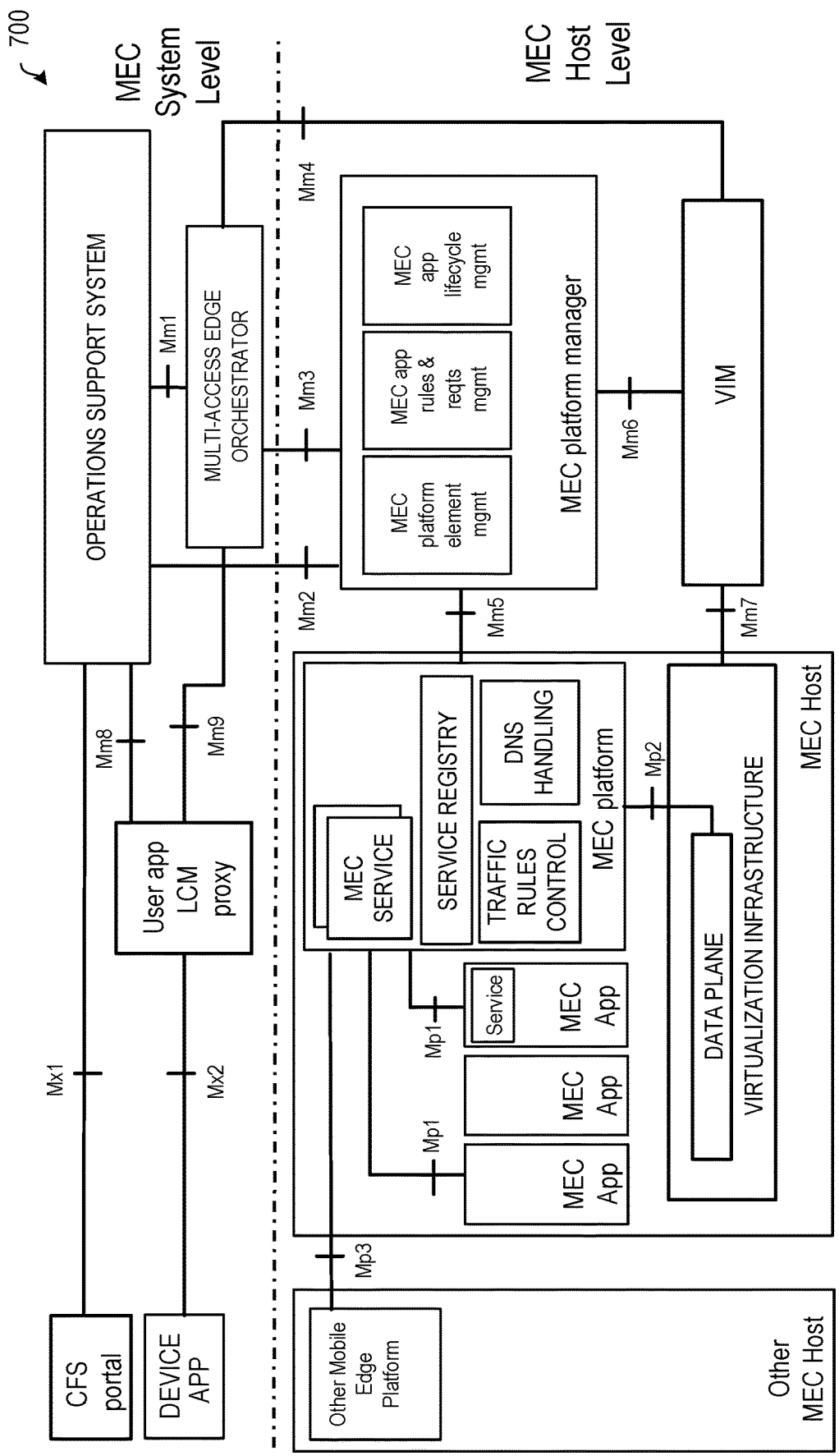
FIG. 7 depicts a block diagram for an example Multi-access Edge Computing (MEC) system architecture in which any one or more of the techniques (e.g., operations, processes, methods, and methodologies) discussed herein may be performed, according to an example.

FIG. 7 depicts a block diagram for an example Multi-access Edge Computing (MEC) system architecture 700. In an example, the MEC system architecture may be defined according to a specification, standard, or other definition (e.g., according to the ETSI ISG MEC-003 specification). In the reference architecture depicted in FIG. 7, the highlighted blocks designate operational components that may implement aspects of the presently disclosed techniques.

Specifically, FIG. 7 depicts a block diagram for an example MEC system architecture 700 in which any one or more of the techniques (e.g., operations, processes, methods, and methodologies) discussed herein may be performed. In an example, the MEC system architecture may be defined according to a specification, standard, or other definition (e.g., according to the ETSI ISG MEC-003 specification). In this diagram, Mp reference points refer to MEC platform functionality; Mm reference points refer to management; and Mx reference points refer to connections to external entities. The services, applications, orchestrators, and other entities discussed herein (e.g., features of edge services, QoS/cost-aware proximity zones, MEO operation, etc. discussed in FIGS. 11 to 19) may be implemented at any number of the entities of the MEC system architecture depicted in FIG. 7, and the communications to perform network operations may be implemented at any number of the interfaces of the MEC system architecture depicted in FIG. 7.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875

GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400 3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92 94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., having near-global designation for Multi-Gigabit Wireless Systems (MGWS)/WiGig; in US (FCC part 15) allocated as total 14 GHz spectrum, while EU (ETSI EN 302 567 and ETSI EN 301 217-2 for fixed P2P) allocated as total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.]. Some of the features in this document are defined for the network side, such as Access Points, eNodeBs, New Radio (NR) or next generation Node Bs (gNodeB or gNB), such as used in the context of 3GPP fifth generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

Figure 17:
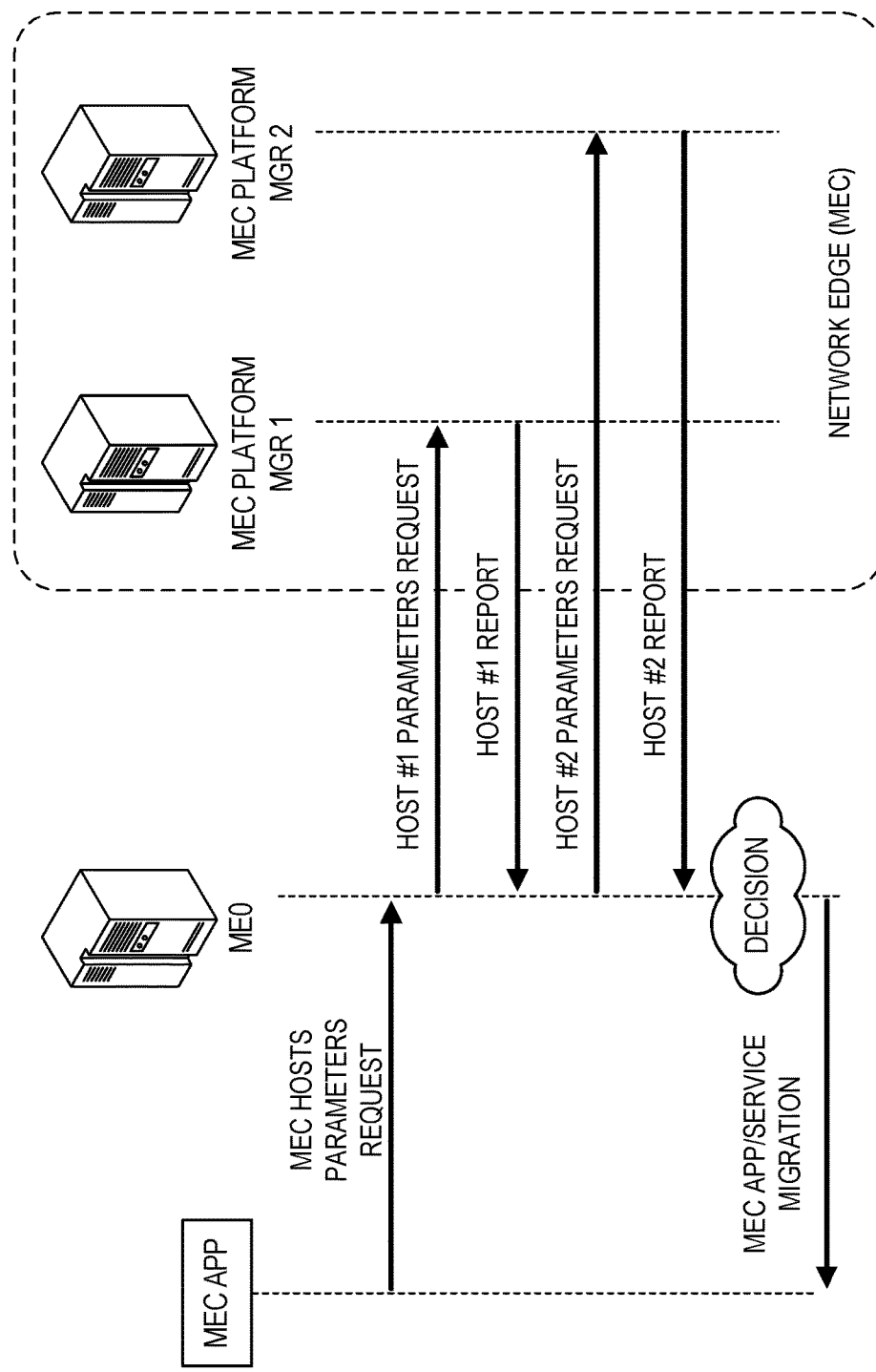
FIG. 17 illustrates operation of a MEC application and services among various MEC hosts, according to an example.

In further examples, the preceding examples of network communications and operations (e.g., with edge device deployments) may be integrated with IoT and like device-based network architectures. FIG. 17 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

MEC and other Edge computing use cases have been envisioned to integrate into a number of network and application settings, including those to support network arrangements of IoT deployments. IoT devices are physical or virtualized objects that may communicate on a network (typically at the edge or endpoint of a network), and may include sensors, actuators, and other input/output components, such as to collect data or perform actions from a real world environment. For example, IoT devices may include low-powered devices that are embedded or attached to everyday things, such as buildings, vehicles, packages, etc., to provide sensor, data, or processing functionality. Recently, IoT devices have become more popular and thus applications and use cases using these devices have proliferated.

Various standards have been proposed to more effectively interconnect and operate IoT devices and IoT network use cases, including those with MEC and mobile network architectures. Some of the relevant communication and network architecture standards include those distributed by groups such as ETSI, 3rd Generation Partnership Project (3GPP), Institute of Electrical and Electronics Engineers (IEEE), in addition to specialized IoT application interaction architecture and configuration standards distributed by working groups such as the Open Connectivity Foundation (OCF).

Often, IoT devices are limited in memory, size, or functionality, enabling larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on QoS terms specified in SLA and service delivery agreements. As will be understood, the use of IoT devices and networks present a number of new challenges in a heterogeneous network of connectivity comprising a combination of wired and wireless technologies.

Figure 8:
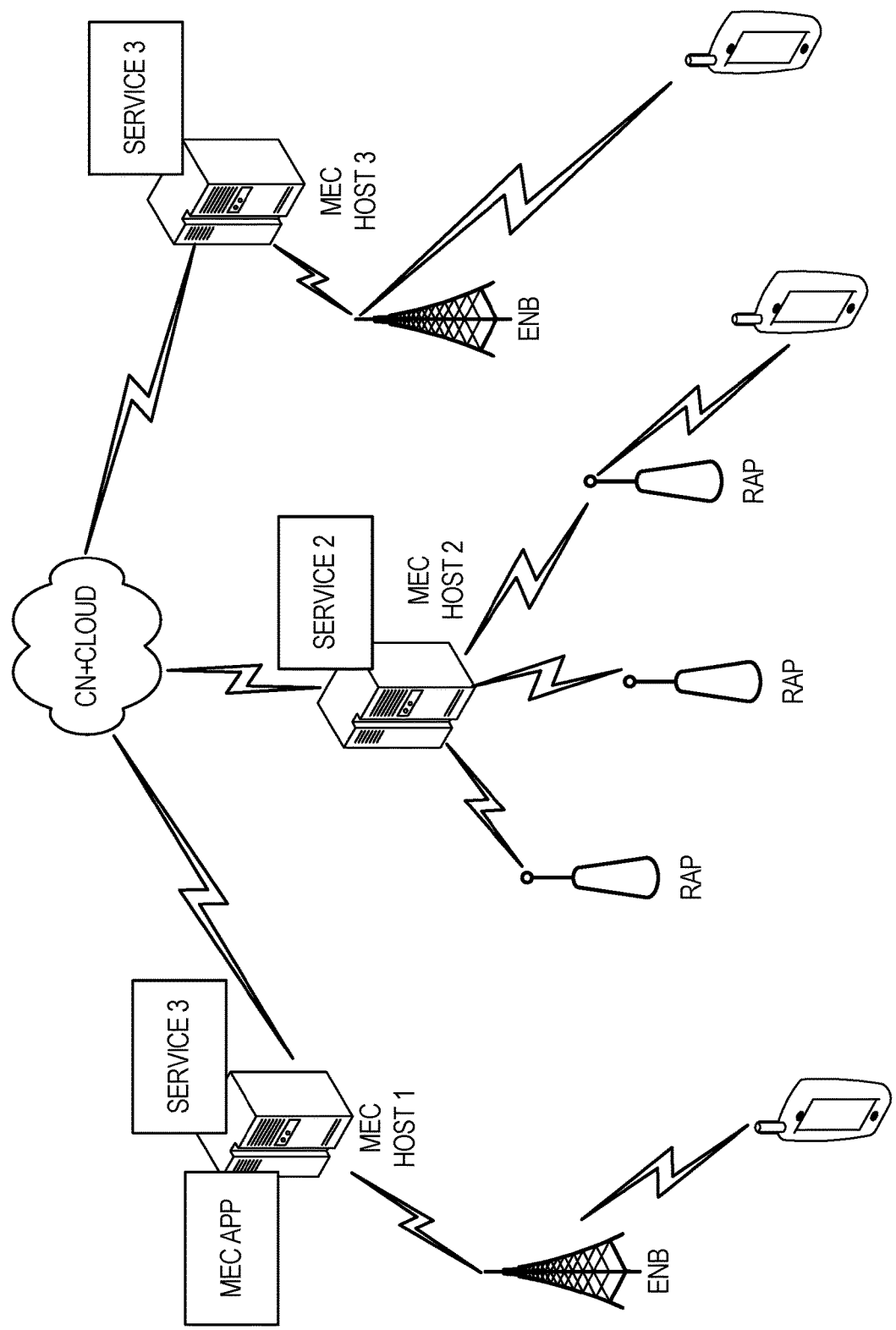
FIG. 8 illustrates a reference communication system with MEC hosts, according to an example.

FIG. 8 illustrates a reference communication system with MEC hosts. For instance, consider a 5G communication system implemented in the elements of FIG. 8, with Multi-access Edge Computing (MEC) hosts deployed across a geographic territory. For the sake of simplicity, consider that FIG. 8 includes one MEC system composed of different MEC hosts, where each MEC host is associated to at least one base station (BS) (e.g., LTE eNB, 5G NB or Radio Access Point (RAP)) in the network.

Figure 9:
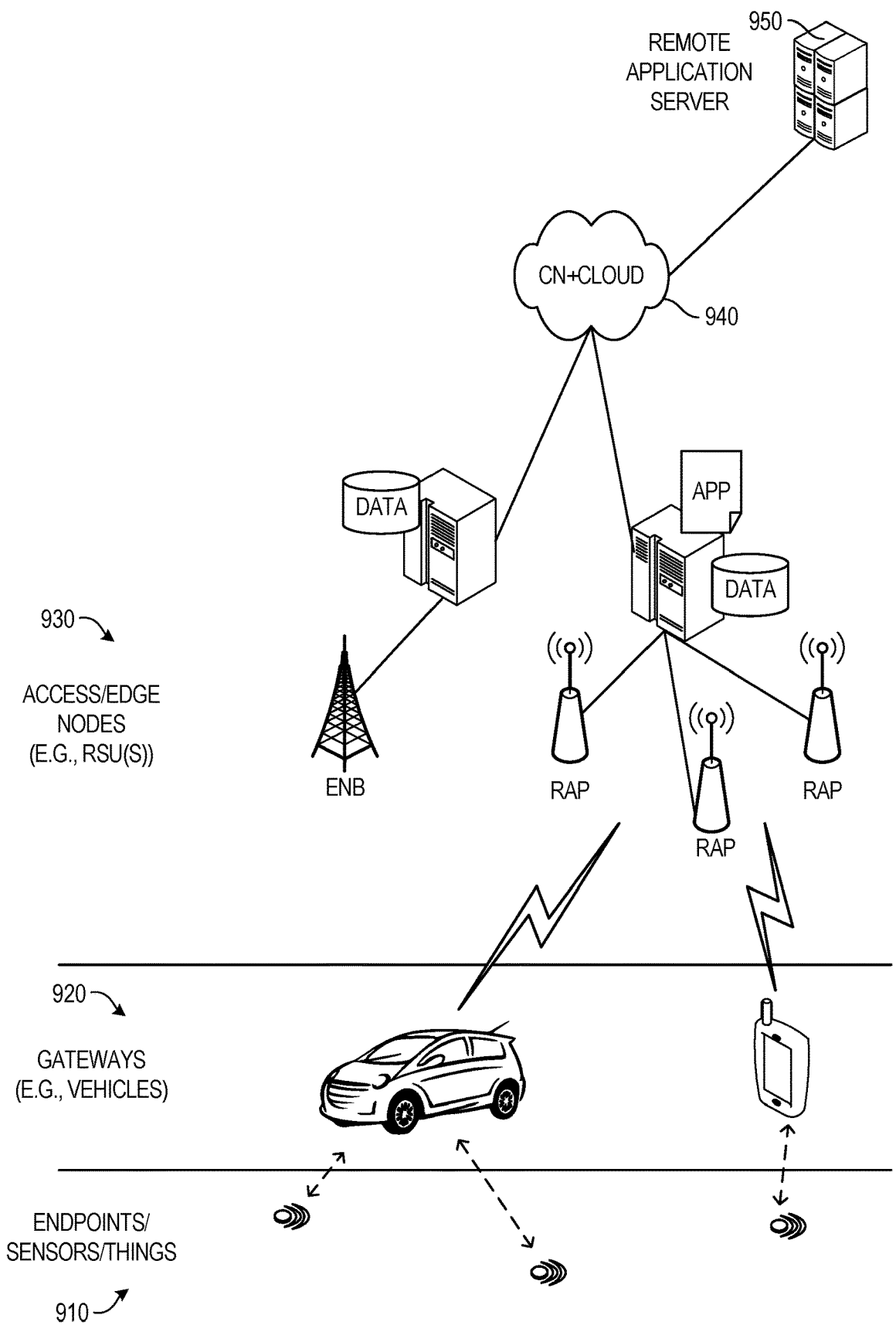
FIG. 9 illustrates devices and network entities in a multi-access communications environment.

FIG. 9 illustrates devices and network entities in a multi-access communications environment. FIG. 9 specifically illustrates the different layers of communication occurring within the environment, starting from endpoint sensors or things 910 (e.g., operating in an IoT network topology); increasing in sophistication to gateways (e.g., vehicles) or intermediate nodes 920, which facilitate the collection and processing of data from endpoints 910; increasing in processing and connectivity sophistication to access or edge nodes 930 (e.g., road-side units operating as edge computing nodes), such as may be embodied by base stations (eNBs), roadside access points (RAPs) or roadside units (RSUs), nodes, or servers; and increasing in connectivity and processing sophistication to a core network or cloud setting 940. Indeed, the processing at the core network or cloud setting 940 may be enhanced by network services as performed by a remote application server 950 or other cloud services.

As shown, in the scenario of FIG. 9, the endpoints 910 communicate various types of information to the gateways or intermediate nodes 920; however, due to the mobility of the gateways or intermediate nodes 920 (such as in a vehicle or mobile computing device) this results in multiple access points or types of access points being used for network access, multiple distinct services and servers being used for computing operations, multiple distinct applications and data being available for processing, and multiple distinct network operations being offered as the characteristics and capabilities of the available network services and network pathways change. In particular, the environment may involve aspects of Vehicle-to-Infrastructure (V2X), Vehicle-to-Vehicle (V2V) and Vehicle-to-Infrastructure (V2I) services from vehicle user equipment (UE) or human-operated portable UEs (e.g., mobile smartphones and computing devices), which introduces significant complexity for computing services and network usage.

Figure 10:
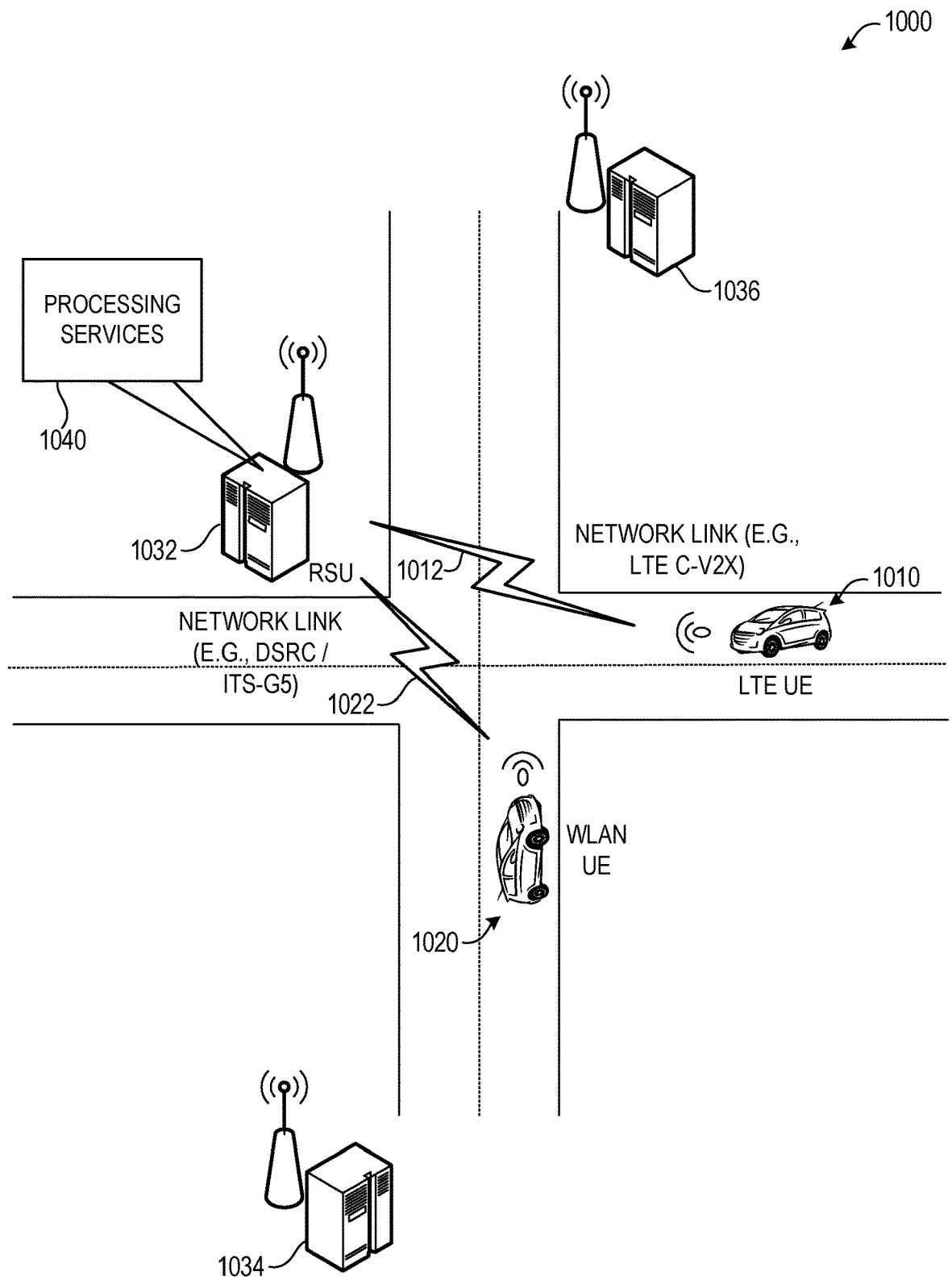
FIG. 10 illustrates an operative arrangement of network and vehicle user equipment, in which various embodiments may be practiced.

FIG. 10 illustrates an operative arrangement 1000 of network and vehicle user equipment, in which various embodiments may be practiced. In arrangement 1000, vehicle user equipment (vUE) 1010, 1020 may operate with a defined communication system (e.g., using a LTE C-V2X WWAN 1012, or a SRC/ETSI ITS-G5 (WLAN) communication network 1022, etc.). In embodiments, a Road Side Unit (RSU) 1032 may provide processing services 1040 by which the vUEs 1010 and 1020 may communicate with one another (or to other services), execute services individually and with each other, or access similar aspects of coordinated or device-specific edge computing services. In embodiments, the processing services 1040 may be provided by a MEC host (e.g., an ETSI MEC host), MEC platform, or other MEC entity implemented in or by hardware of the RSU 1032. In this example, the RSU 1032 may be a stationary RSU, such as an eNB-type RSU or other like infrastructure. In other embodiments, the RSU 1032 may be a mobile RSU or a UE-type RSU, which may be implemented by a vehicle (e.g., a truck), pedestrian, or some other device with such capabilities. In these cases, mobility issues can be managed in order to ensure a proper radio coverage of the applicable services. For instance, mobility may be managed as the respective vUEs 1010, 1020 transition from, and to, operation at other RSUs, such as RSUs 1034, 1036, and other network nodes not shown.

A typical use case corresponds to a MEC application (denoted as 'MEC app' in the following paragraphs) running on a MEC host, which needs to consume MEC services instantiated within the (same) MEC system. The queried services are assumed available in the MEC system, however, not necessarily running at the same MEC host (denoted as a 'MEC server' in the following paragraphs).

With existing approaches, the ETSI MEC standard (e.g., the current version of ETSI GS MEC 011, "Mobile Edge Computing (MEC); MEC Platform Application Enablement", table 6.2.2-1) considers a set of attributes of the ServiceInfo type (i.e., the type providing the general information of a MEC service) to indicate whether the MEC service and a MEC app that may need to consume it are placed in the same locality or not. The relevant attributes (i.e., scopeOfLocality, consumedLocalOnly, isLocal) are bolded and described in TABLE 1 below. However, as is explained in the next section, neither the construction of proximity zones (e.g., values 'ZONE' or 'ZONE GROUP' of the consumedLocalOnly attribute) is explained in the standard, nor are solutions provided for a MEC app to reach a performance/cost-effective decision upon consuming this MEC service or not.

TABLE 1

| Attribute name | Data type | Cardinality | Description |
| --- | --- | --- | --- |
| serInstanceId | String | 0 ... 1 | Identifier of the service instance assigned by the MEPM/MEC platform. For the uniqueness of the identifier across the MEC system, UUID format [i.7] is recommended. Shall be absent in POST requests, and present otherwise. |
| serName | String | 1 | The name of the service. This is how the service producing MEC application identifies the service instance it produces. |
| serCategory | CategoryRef | 0 ... 1 | A Category reference. (The category resource is used to group product offerings, service and resource candidates in logical containers. Categories may contain other categories and/or product offerings, resource or service candidates.) (see note 1) For the serCategory, the example values include: 1. "RNI" 2. "Location" 3. "Bandwidth Management" |
| version | String | 1 | The version of the service. |
| state | Enum (inlined) | 1 | Contains the service state: ACTIVE, INACTIVE. |
| transportId | String | 0 ... 1 | Identifier of the platform-provided transport to be used by the service. Valid identifiers may be obtained using the "Transport information query" procedure. May be present in POST requests to signal the use of a platform-provided transport for the service, and shall be absent otherwise. See note 2. |
| transportInfo | TransportInfo | 0 ... 1 | Information regarding the transport used by the service. May be present in POST requests to signal the use of an application-provided transport for the service, and shall be present otherwise. See note 2. |
| Serializer | SerializerTypes | 1 | Indicate the supported serialization format of the service. |
| scopeOfLocality | Enum (inlined) | 0 ... 1 | The scope of locality as expressed by "consumedLocalOnly" and "isLocal". Permitted values: MEC_HOST NFVI_POP ZONE ZONE_GROUP NFVI_NODE If absent, defaults to MEC_HOST. See note 3. |
| consumedLocalOnly | Boolean | 0 ... 1 | Indicate whether the service can only be consumed by the MEC applications located in the same locality (as defined by scopeOfLocality) as this service instance (TRUE) or not (FALSE). Default to TRUE if absent. |
| isLocal | Boolean | 0 ... 1 | Indicate whether the service is located in the same locality (as defined by scopeOfLocality) as the consuming MEC application (TRUE) or not (FALSE). Default to TRUE if absent. See note 4. |

NOTE 1:
The service category may be included in the application descriptor. It may be allocated by the operator or by the application developer.
NOTE 2:
Either transportId or transportInfo but not both shall be present in POST requests.
NOTE 3:
Values NFVI_POP, ZONE, ZONE_GROUP and NFVI_NODE are used when the service instance is deployed as a VNF.
NOTE 4:
The isLocal is used only in service availability query response and service availability subscription/notification messages.

The ServiceInfo type described in the current ETSI MEC standard does not provide any details on the criteria upon constructing MEC app proximity zones. Also, the current ETSI MEC standard does not provide any alternatives to the MEC app instant when it is in need of a MEC service which is instantiated outside its locality (i.e., 'MEC_HOST', 'NFVI_POP', 'ZONE', 'ZONE_GROUP', 'NFVI_NODE').

Figure 11:
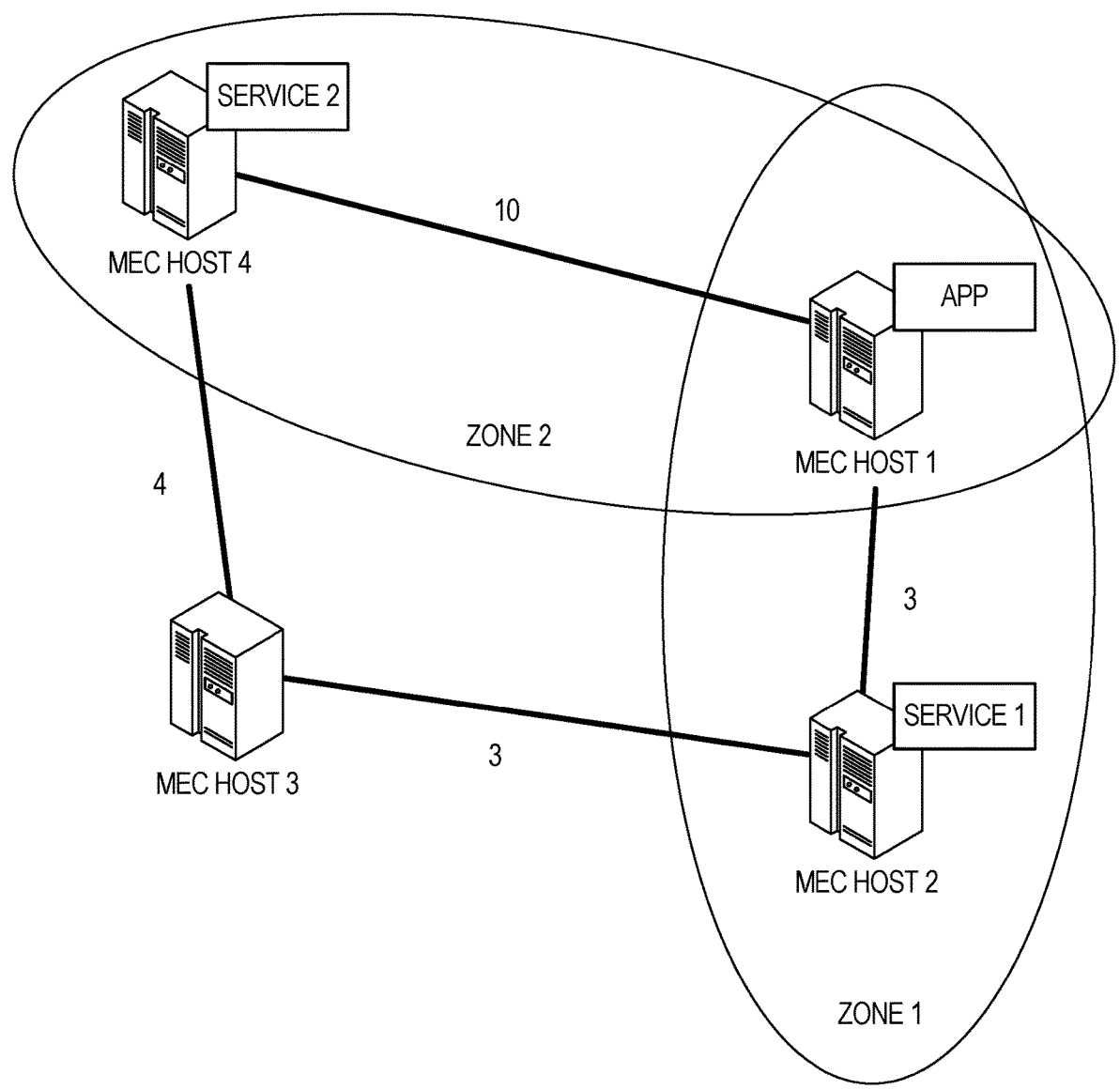
FIG. 11 illustrates proximity zones of MEC apps hosted among MEC hosts, according to an example.

FIG. 11 illustrates proximity zones of MEC apps hosted among MEC hosts. As an example, FIG. 11 depicts a MEC system deployment including four MEC hosts. A MEC app (in need of consuming MEC Service 1 & MEC Service 2) is hosted by MEC Host 1.

FIG. 11 further illustrates a proximity zone (equivalently, locality scope) of a MEC app hosted by MEC Host 1. For instance, for a MEC Service 1: scopeOfLocality=ZONE 1, consumedLocalOnly=TRUE, and isLocal=TRUE. For MEC Service 2: scopeOfLocality=ZONE 2, consumedLocalOnly=TRUE, and isLocal=TRUE). The numbers next to the edges of the graph correspond to cost units considered by the MEC app when it decides to consume MEC services instantiated at MEC hosts different from MEC Host 1.

With conventional approaches, MEC Service 1 may be consumed by the MEC app, because the service is local to the MEC app. However, although the price to be paid by the MEC app (expressed in, for example, cost or latency performance) for the consumption of MEC Service 1 is only 3 cost units, the consumption of MEC Service 2 located at MEC Host 4 will demand 10 cost units. Assuming that, for example, the MEC app may only 'afford' up to 5 cost units per MEC Service, the consumption of MEC Service 2 will be proven problematic (i.e., overly costly, or, equivalently, performance degrading).

Such a situation calls for the need to consider possible MEC app instant migration, in order to jointly satisfy the performance/cost requirements posed by the MEC app with regards to consumption of all needed services. However, as 'MEC mobility' of this kind may substantially affect the Quality of Experience (QoE) of the UE (e.g., MEC Host 1) running the MEC app—for example, the latency between the UE and the new MEC server hosting the MEC app instance—the solution needs to be designed carefully in order to account for both aspects, namely: (a) QoS referring to the UE-to-MEC app connectivity; and (b) QoS (and cost) referring to the (logical/physical) distance between the instantiated MEC app and the needed MEC service. These aspects have not been fully addressed by conventional MEC implementations. Moreover, in existing MEC standards, there is no reference of the possibility to consume services running on different MEC systems, which is, in principle, possible through the Mp3 interface of FIG. 5. For that purpose, a MEC application instance may need to query the availability of a list of MEC service instances in the local MEC host or in local and remote MEC hosts (even potentially in different MEC systems).

In a first aspect, MEC enhancements may be used to enable a flexible usage of MEC platform services consumption locally, or in remote MEC hosts of the MEC system, or across different MEC systems. In the current ETSI MEC 011 specification (e.g., indicated in TABLE 1, above), many values of the scopeOfLocality attribute are only used when the service instance is deployed as a VNF. However, the values ZONE and ZONE GROUP define zones of MEC hosts, and in principle may be also applicable in general. Moreover, in the ETSI MEC 011 specification, no reference is made on the possibility to consume services running on different MEC systems, which is, in principle, possible through the Mp3 interface.

Based on this arrangement, changes may be incorporated into the MEC specification to add additional details regarding the scope of locality. In an example, these specification changes may include making the scope of "ZONE" and ZONE_GROUP" more general, and the addition of a value (MEC_SYSTEM) indicating the identifier of a different MEC system. The following table, TABLE 2, includes bolded changes which may be adapted to indicate such values:

TABLE 2

| scopeOfLocality | Enum (inlined) | 0 ... 1 | The scope of locality as expressed by "consumedLocalOnly" and "isLocal". Permitted values: MEC_SYSTEM MEC_HOST NFVI_POP ZONE ZONE GROUP NFVI_NODE If absent, defaults to MEC_HOST. See note 3. |
|---|---|---|---|

NOTE 1:
The service category may be included in the application descriptor. It may be allocated by the operator or by the application developer.
NOTE 2:
Either transportId or transportInfo but not both shall be present in POST requests.
NOTE 3:
Values NFVI_POP, and NFVI_NODE are used when the service instance is deployed as a VNF.
NOTE 4:
The isLocal is used only in service availability query response and service availability subscription/notification messages . . .
NOTE 5:
The value MEC_SYSTEM indicates the identifier of the MEC system in which the service is deployed. If the service is running on the same MEC system as the MEC app, then it will have the same identifier.

Additionally, a MEC application instance may need to query the availability of a list of MEC service instances in the local MEC host or in local and remote MEC hosts (even potentially in different MEC systems), and for that purpose also the related attributes in Table 6.2.2-1 of the MEC 011

GS should be defined coherently in the GET method (Table 7.4.3.1-1 of the MEC 011 GS). The following table, TABLE 3, includes bolded text indicating the addition of "scope_of_locality," "consumed_local_only," and "is_local" values to this specification:

TABLE 3

| Name | Data type | Cardinality | Remarks |
|---|---|---|---|
| ser_instance_id | String | 0 . . . N | A MEC application instance may use multiple ser_instance_ids as an input parameter to query the availability of a list of MEC service instances. See note. |
| ser_name | String | 0 . . . N | A MEC application instance may use multiple ser_names as an input parameter to query the availability of a list of MEC service instances. See note. |
| ser_category_id | String | 0 . . . 1 | A MEC application instance may use ser_category_id as an input parameter to query the availability of a list of MEC service instances in a serCategory. See note. |
| scope_of_locality | Enum (inlined) | 0 . . . 1 | A MEC application instance may use scope_of_locality as an input parameter to query the availability of a list of MEC service instances with a certain scope of locality. |
| consumed_local_only | Boolean | 0 . . . 1 | A MEC application instance may use consumed_local_only as an input parameter to query the availability of a list of MEC service instances that can be consumed only locally. |
| is_local | Boolean | 0 . . . 1 | A MEC application instance may use is_local as an input parameter to query the availability of a list of MEC service instances in the local MEC host or in local and remote MEC hosts. |

NOTE:
Either "ser_instance_id" or "ser_name" or "ser_category_id" or none of them shall be present.

These values coherently permit the MEC app instance to acquire the needed information and properly consume instances of the MEC services in the local MEC host or both in local and remote MEC hosts (even potentially in different MEC systems).

Additionally, the context of MEC services implicitly includes not only MEC APIs contained in the MEC platform, but also service producing MEC application instances. In fact, according to ETSI MEC architecture, MEC application instances may be producers of services. In that case, the MEC 011 GS specification may define the mechanism of Service availability update and new service registration, through which authorized relevant applications will also be notified about these service availabilities.

Next, the following techniques address a method for defining QoS/cost-aware proximity zones around MEC servers hosting MEC applications. This allows the MEC system to properly define proximity zones based on performance criteria and/or cost metrics.

Figure 12:
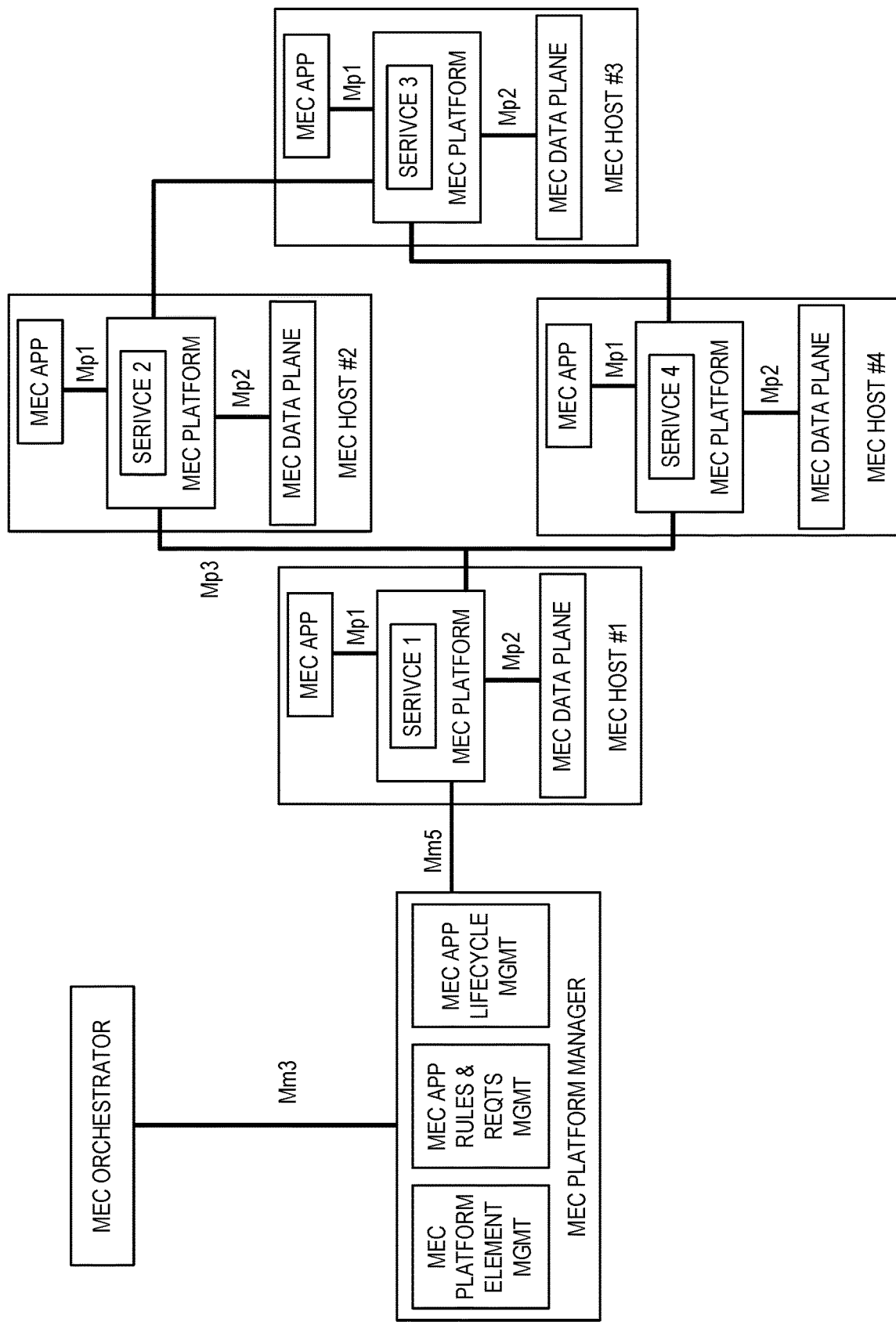
FIG. 12 illustrates a topology of a MEC system including four MEC hosts, according to an example.

FIG. 12 illustrates a topology of a MEC system including four MEC hosts, according to an example. FIG. 12 specifically depicts an example topology of a MEC system consisting of four MEC hosts within which MEC platforms run different MEC services, a MEC Platform Manager (MEPM), a MEC Orchestrator (MEO), as well as the various interfaces/interconnections between these entities (e.g., interface Mm3 connecting the MEO with the MEPM, interface Mm5 connecting the MEPM with the MEC platform, as well as interface Mp3 inter-connecting the MEC hosts of the system, along with interfaces Mp1 and Mp2 within each MEC host).

It is assumed that a MEC app is running on MEC Host #1, which is potentially in need of consuming some of MEC Services 1, 2, 3 and 4. To evaluate the effort needed so as for the MEC app to consume a specific MEC service, the proximities of MEC hosts #2, 3 and 4 need to be measured (using MEC Host #1 as a reference), classified according to a performance or a cost metric and stored in the MEC system asynchronously.

To accomplish that procedure, the MEC Orchestrator (MEO) may construct a table defining zones (i.e., clusters of MEC hosts), based on the accumulated latency (or, any other performance/cost-based utility) for reaching the reference MEC host running the MEC app (i.e., MEC Host #1 in an example). In fact, the MEC Orchestrator (MEO) is the entity responsible for gathering, classifying and storing the proximity measurements, as it has an overall view of the MEC system topology, the available resources and the available MEC services.

Figure 13:
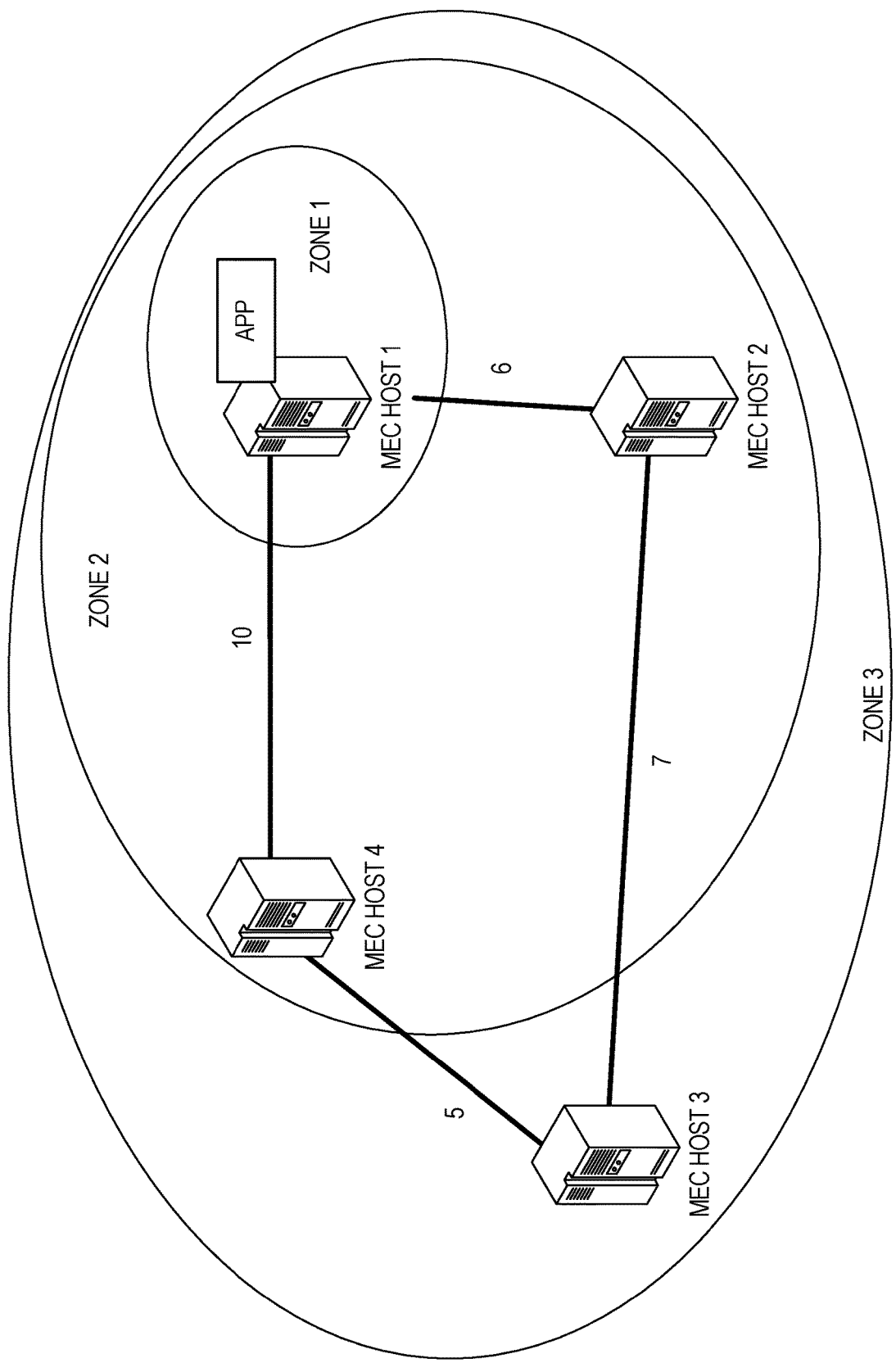
FIG. 13 illustrates MEC host proximity zones defined according to a utility-based classification, according to an example.

As an example, TABLE 4 below, accompanied by FIG. 13, provides an example of such proximity-based classification maintained at the MEO. It should be noted that the cost values are just indicative as well as that a proximity zone which is an enclave (e.g., subset) of another proximity zone is part of the latter one.

TABLE 4

| Proximity zone | Minimum cost | Maximum cost (units) | MEC hosts of the zone |
|---|---|---|---|
| 1 | 0 | 5 | 1 |
| 2 | 0 | 10 | 1, 2, 4 |
| 3 | 0 | Infinity | 1, 2, 3, 4 |

TABLE 4 specifically defines an example data structure in which MEC hosts of a MEC system are classified into proximity zones according to a utility criterion. In reference, MEC Host #1 is where the MEC app is instantiated.

Proximity zones may be defined and stored in a data structure, such as with records in a database. For example, each proximity zone may be defined using the tuple Zone: {zone_id, cost_range, app_id, host_id}, where zone_id is a unique identifier to identify a zone, cost_range is a numerical value indicating maximum cost allowed for the zone, app_id is a unique identifier for the application for which the zone is applicable, and host_id is the identifier for the host where the service that the application of app_id is being executed. It is understood that the minimum cost is always 0 in this embodiment. In other implementations, a cost_min and cost_max value may be used to define a lower and upper bound costs for the zone. Cost may be a reflection of network latency, processing overhead, processing time, network throughput, or other performance metrics. Further, the present example uses an application-centric zone—zones are specific to an application on a host. In other implementations, zones may be constructed as host-centric, in which case, the Zone tuple may be {zone_id, cost_range, local_host_id, remote_host_id}, where local_host_id is the host that is executing the app and remote_host_id is the host that is providing the service.

To identify which services belong to a particular zone, with respect to a reference application, the MEO may evaluate the hosts in a MEC system to determine the cost value for each service with respect to the application. A tuple Cost: {app_id, service id, cost value} may be constructed to capture the application identifier and the service id of the service under evaluation, and the cost value for the application associated with the app_id to consume the service with service id. The app_id is the unique identifier for the application and may be associated with a particular MEC host using the tuple Host: {host_id, app_id}. The service_id is a unique identifier for the service and may be associated with a particular MEC host using the tuple Service: {service_id, host_id}.

The app_id, service_id, host_id, and other identifiers may be globally unique (e.g., unique among all MEC systems) or locally unique (e.g., unique to the MEC system in which the hosts operate). If the identifiers are only locally unique, another value sys_id may be captured in the Service record and the Host record.

Once cost metrics are captured to the Cost records for services that an application may eventually consume, the Cost records may be filtered, sorted, or binned to identify Cost records with certain threshold values of cost value based on the cost_range value of the Zone record. The Service records are used to look up the host that is executing the services in a certain cost_range of the application. The identified hosts are then added as Zone records.

Zone maps, as represented using Zone records and other data structures, may be stored at a MEO, MEC host, or elsewhere in a MEC system. MEC systems may store one another's zone maps to allow for inter-MEC system service sharing.

FIG. 13 illustrates example MEC host proximity zones defined according to a utility-based classification. Specifically, in FIG. 13, the visualization of MEC host proximity zones (as seen by the MEC app) is adapted according to the utility-based classification of TABLE 4. As shown in FIG. 13, only MEC Host #1 belongs to proximity zone 1, whereas proximity zones 2 and 3 incorporate other MEC hosts #2, 3, and 4, the hosted MEC services in which may be reached, at a higher cost (or, worse, for example, MEC app-to-service latency performance).

Figure 14:
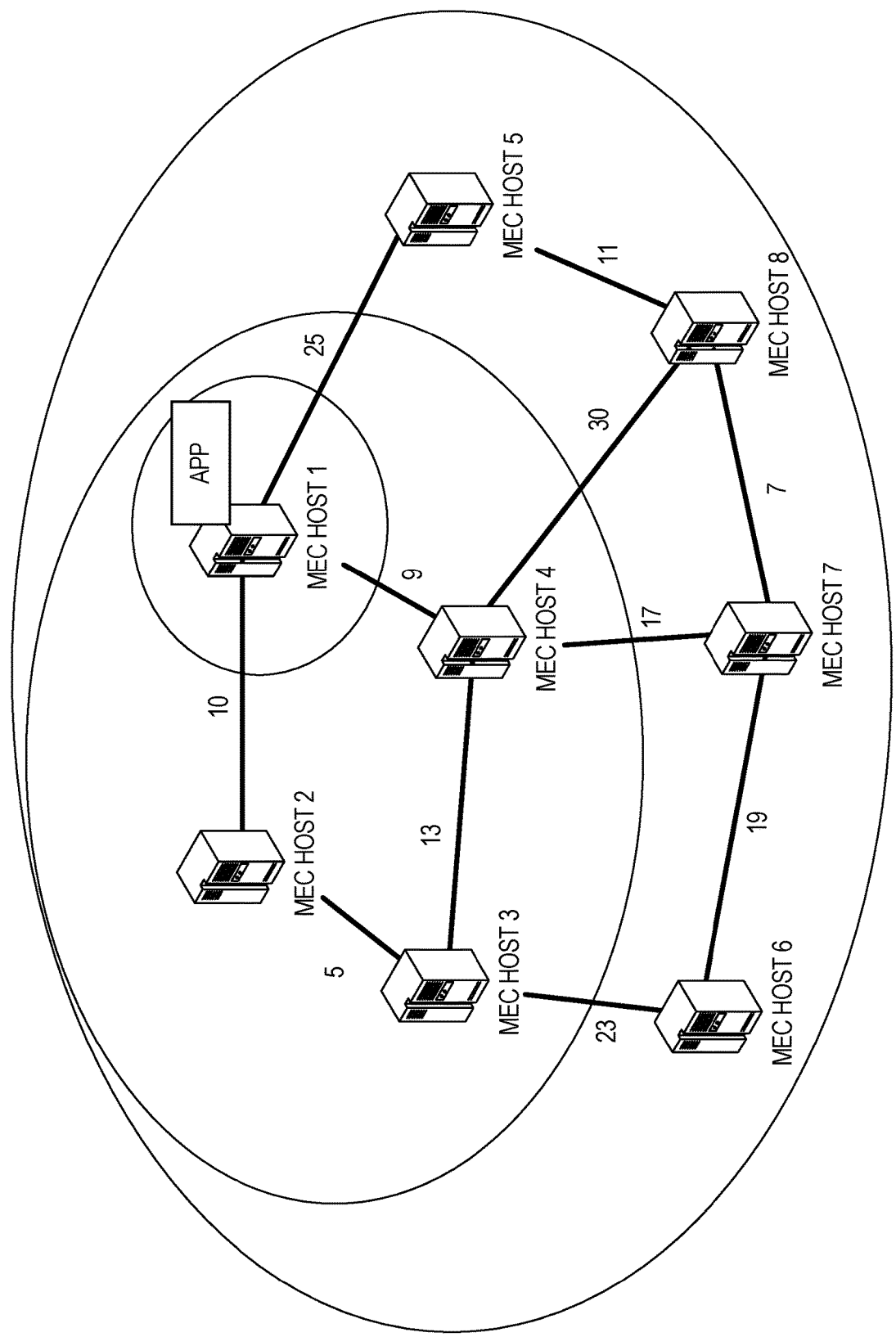
FIG. 14 illustrates a proximity zone visualization among MEC hosts, according to an example.

FIG. 14 illustrates another example proximity zone visualization among MEC hosts, again in a scenario where MEC Host #1 hosting a MEC app is the reference. In FIG. 14, this set of utility-based proximity zones defined around MEC Host #1, enables a MEO to decide on whether to relocate a MEC app instance or not, jointly based on end-to-end QoS/cost requirements and the need to consume specific MEC services.

In the example of FIG. 14, the construction of the MEC proximity zones should be updated each time the MEC system deployment (topology) is altered, for example, when more MEC hosts are deployed over a given area (deployment density increased) or taken out of service, and/or, when the physical interfaces inter-connecting the MEC servers are upgraded. Having defined MEC proximity zones according to QoS/cost-based criteria, this example introduces a signaling protocol among the various MEC system entities with the aim of achieving QoS-aware/cost-efficient service consumption by a given MEC application instantiated at a host of the focused MEC system.

Figure 15:
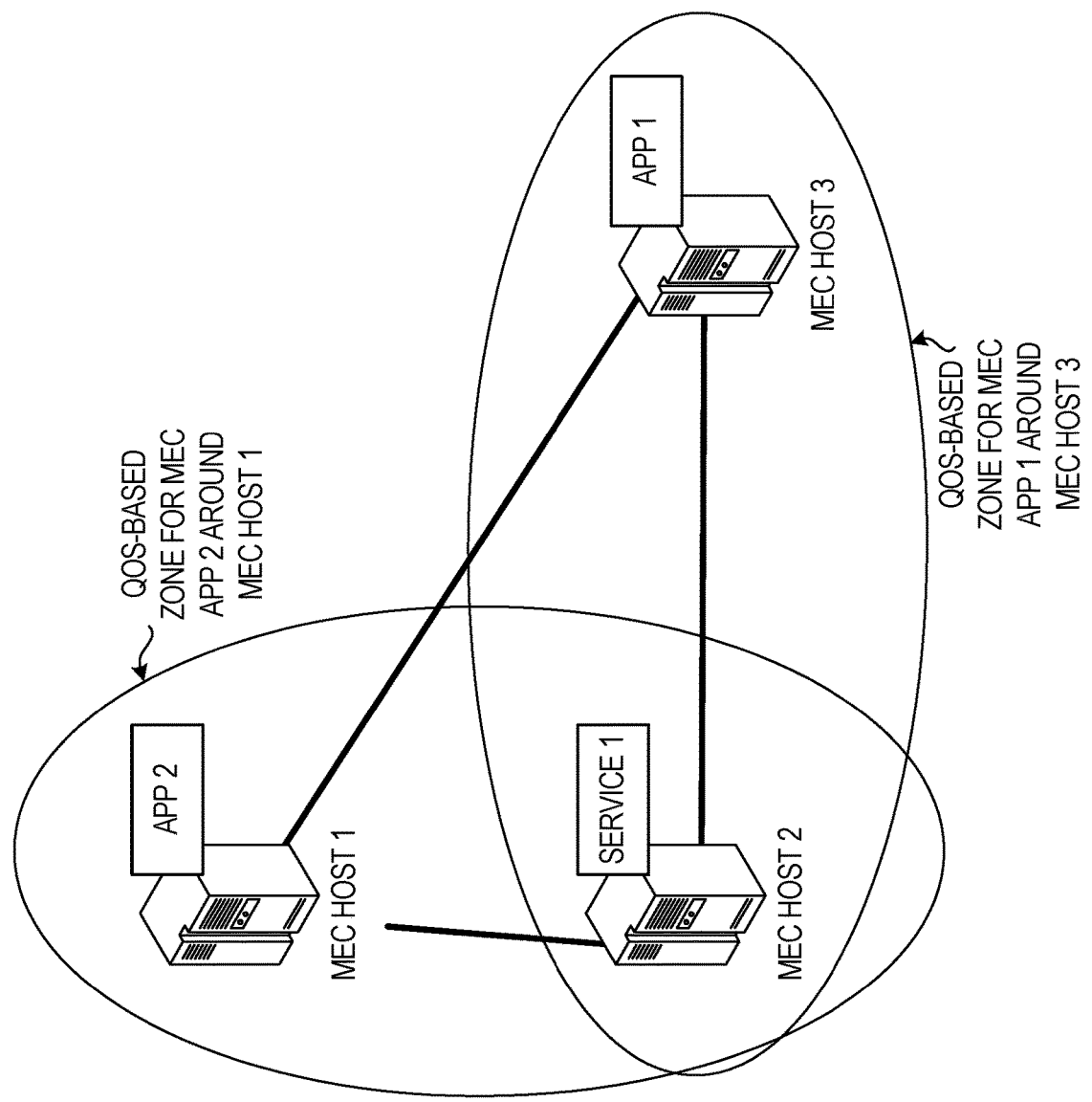
FIG. 15 illustrates a Quality-of-Service (QoS) zone visualization among MEC hosts, according to an example.

The present techniques enable a signaling protocol among the involved MEC entities for QoS/cost-efficient MEC service consumption by a MEC application, taking into account the defined proximity zones. FIG. 15 specifically illustrates a Quality-of-Service (QoS) zone visualization among MEC hosts, in an example where MEC Service 1 is local to both MEC App 1 and MEC App 2, which need to consume it. In this example, multiple MEC apps may use the same service located at a different MEC host.

In the beginning, only MEC App 1 is running on MEC Host 3, consuming MEC Service 1, which is instantiated at MEC Host 2. However, afterwards, MEC App 2, instantiated at MEC Host 1 also needs to consume MEC Service 1. As this is within the latency/cost zone defined for MEC App 2, it may consume the service right away, without any need for MEC App 2 to be relocated for better proximity.

Figure 16:
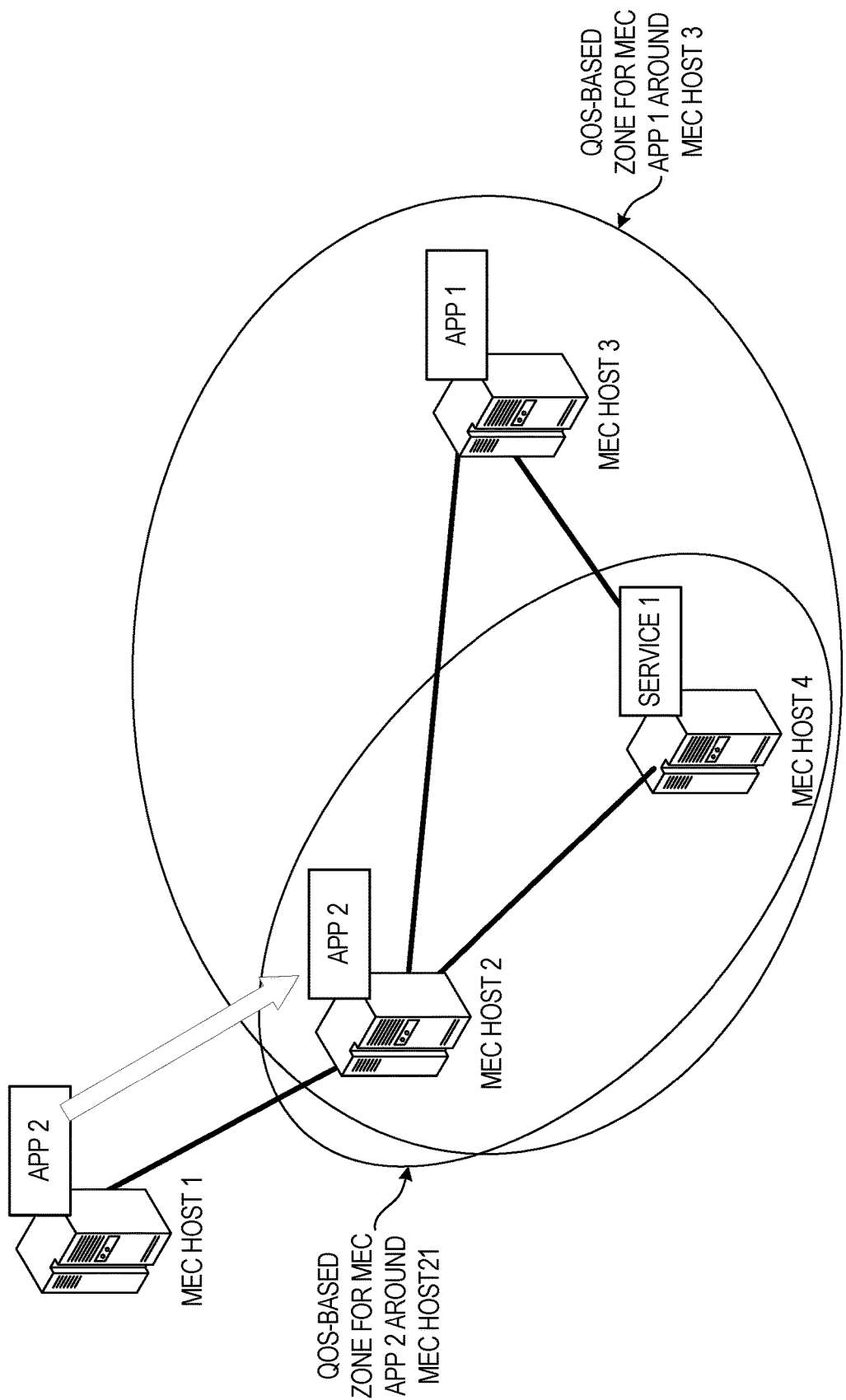
FIG. 16 illustrates app migration within a Quality-of-Service (QoS) zone visualization among MEC hosts, according to an example.

FIG. 16 illustrates app migration within a Quality-of-Service (QoS) zone visualization among MEC hosts. In the example depicted in FIG. 16, with a variation to the system topology, the situation differs from the scenario of FIG. 15. In the beginning, only MEC App 1 running on host 3 is consuming MEC Service 1 present at MEC Host 4. When MEC App 2 running on MEC Host 1 requests to consume MEC Service 1, since the service is not local to it (e.g., the service is outside its proximity zone), the MEC orchestrator will need to evaluate whether an instance migration to MEC Host 2 would satisfy the performance or cost requirements for consuming the service, together with the performance (e.g., latency) experienced by the UE once the MEC application instance migration is performed. If the latter requirement is satisfied, the MEC app instance may be relocated to MEC Host 2, and therefore, the needed service will be within MEC App 2's proximity zone. Alternatively, Service 1 may be migrated to MEC Host 2, if such relocation of Service 1 would satisfy MEC App 1 and MEC App 2's proximity zone requirements.

FIG. 17 illustrates operation of a MEC application and services among various MEC hosts. Further to the example depicted in FIG. 16, and concentrating on MEC App 2, the message sequence chart of FIG. 17 depicts a signaling protocol among the involved MEC entities to support MEC service consumption based on the described QoS/cost-relevant zoning criteria. The internal decision taken by the MEO is not to be specified in the standard, but it is based on the information obtained from the different MEC hosts in the system with a goal of a QoS/cost-efficient MEC service consumption by MEC App 2, taking into account the defined proximity zones. The last message of the chart is a MEC application migration indication, but it may also happen that no migration is needed. In this case, the simple answer is empty (200=OK).

MEC application or service migration may also occur across MEC systems. For instance, MEC systems that are associated with different network operators may communicate MEC orchestrator, MEC host, and MEC service information to other MEC systems. This sharing is used to increase efficiency of MEC application and service quality-of-experience and QoS. In this case, the principle of MEC-as-a-service is applied to the communication among all involved entities.

For instance, MEC system 1 may expose information through its MEO1, and a MEC application running in MEC system 1 may consume services also in another MEC system 2, which exposes information to the MEO-1 through its MEO-2. At the end, MEO-1 may decide, based on the overall knowledge of MEC systems 1 and 2, whether to migrate an application or service. The MEC application and MEC host in MEC system 1 may receive a message from its MEO-1 to migrate.

Figure 18:
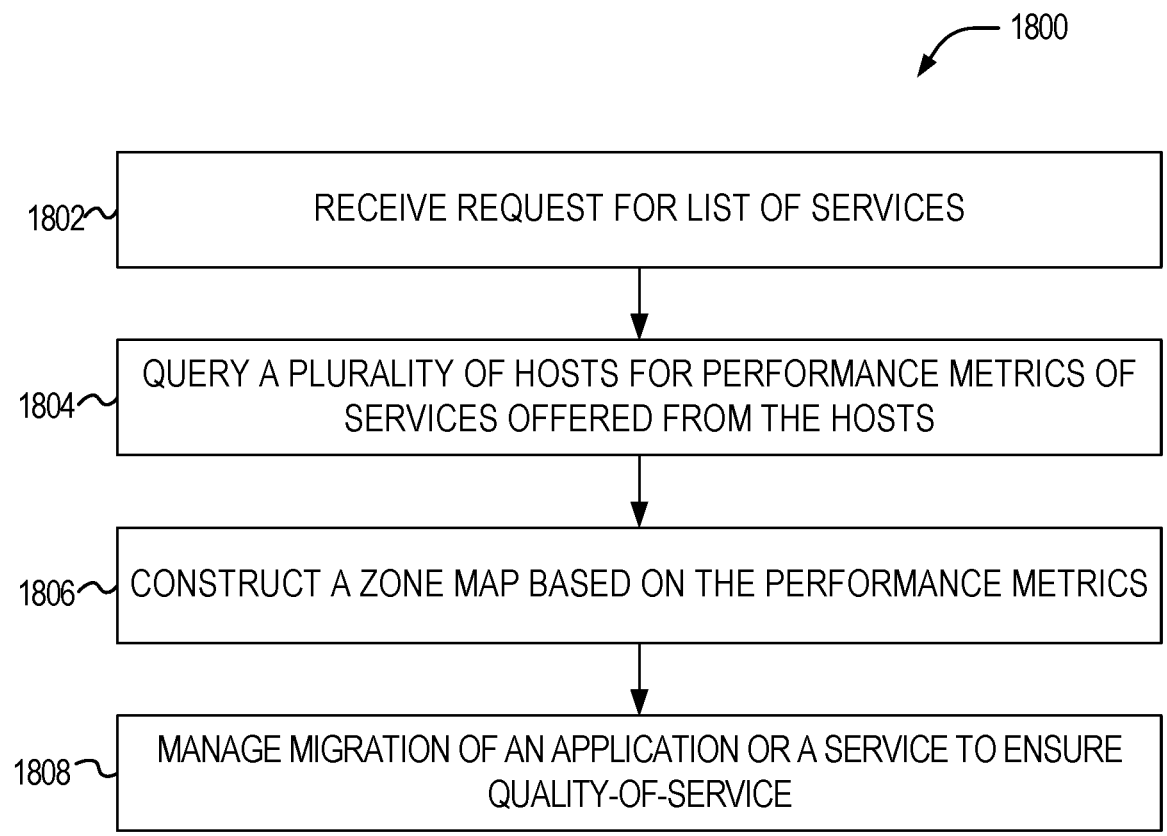
FIG. 18 is a flowchart illustrating a method for managing service consumption using zones, according to an example.

FIG. 18 is a flowchart illustrating a method for managing service consumption using zones, according to an example. At 1802, a request for a list of services and corresponding proximity zones is received from an application executing at a host.

At 1804, in response to receiving the request for the list of services, a plurality of hosts is queried for performance metrics of respective services offered from the plurality of hosts, the respective services to be used by the application executing at the host.

At 1806, a zone map is constructed, the zone map maintaining a mapping between the application and the plurality of hosts based on the performance metrics.

At 1808, migration of the application or a service of the respective services is managed, based on the zone map, to ensure a quality-of-service (QoS) of the application.

In an embodiment, a zone of the zone map is created based on an upper cost boundary and a lower cost boundary, the upper cost boundary representing a maximum cost for use of the respective services by the application. In a further embodiment, the upper cost boundary is represented by a threshold network latency. In a related embodiment, the upper cost boundary is represented by a threshold network throughput. In another embodiment, the upper cost boundary is represented by a threshold processing completion time.

In an embodiment, the request includes an input parameter to query the availability of a list of service instances with a scope_of_locality. In an embodiment, the request includes an input parameter to query the availability of a list of service instances that can be consumed only locally. In an embodiment, the request includes an input parameter to query the availability of a list of service instances that are executing at the host.

In an embodiment, querying the plurality of hosts for performance metrics of respective services offered from the plurality of hosts includes interfacing with a second MEC system. In a further embodiment, interfacing with the second MEC system includes transmitting the query to a MEC orchestrator of the second MEC system, the MEC orchestrator configured to query hosts in the second MEC system for performance metrics of services available from the hosts of the second MEC system.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an apparatus operating as a multi-access edge computing (MEC) orchestrator to manage services consumption using zones, comprising: processing circuitry; and a memory device including instructions embodied thereon, wherein the instructions, which when executed by the processing circuitry, configure the processing circuitry to perform operations to: receive, from an application executing at a host, a request for a list of services and corresponding proximity zones; in response to receiving the request for the list of services, query a plurality of hosts for performance metrics of respective services offered from the plurality of hosts, the respective services to be used by the application executing at the host; construct a zone map, the zone map maintaining a mapping between the application and the plurality of hosts based on the performance metrics; and manage migration of the application or a service of the respective services, based on the zone map, to ensure a quality-of-service (QoS) of the application.

In Example 2, the subject matter of Example 1 includes, wherein a zone of the zone map is created based on an upper cost boundary and a lower cost boundary, the upper cost boundary representing a maximum cost for use of the respective services by the application.

In Example 3, the subject matter of Example 2 includes, wherein the upper cost boundary is represented by a threshold network latency.

In Example 4, the subject matter of Examples 2-3 includes, wherein the upper cost boundary is represented by a threshold network throughput.

In Example 5, the subject matter of Examples 2-4 includes, wherein the upper cost boundary is represented by a threshold processing completion time.

In Example 6, the subject matter of Examples 1-5 includes, wherein the request includes an input parameter to query the availability of a list of service instances with a scope of locality.

In Example 7, the subject matter of Examples 1-6 includes, wherein the request includes an input parameter to query the availability of a list of service instances that can be consumed only locally.

In Example 8, the subject matter of Examples 1-7 includes, wherein the request includes an input parameter to query the availability of a list of service instances that are executing at the host.

In Example 9, the subject matter of Examples 1-8 includes, wherein to query the plurality of hosts for performance metrics of respective services offered from the plurality of hosts, the apparatus performs operations to interface with a second MEC system.

In Example 10, the subject matter of Example 9 includes, wherein to interface with the second MEC system, the apparatus performs operations to transmit the query to a MEC orchestrator of the second MEC system, the MEC orchestrator configured to query hosts in the second MEC system for performance metrics of services available from the hosts of the second MEC system.

In Example 11, the subject matter of Examples 1-10 includes, wherein the plurality of hosts includes multi-access edge computing (MEC) hosts that operate according to a standard from an ETSI (European Telecommunications Standards Institute) MEC standards family.

Example 12 is a method for managing service consumption using zones, comprising: receiving, from an application executing at a host, a request for a list of services and corresponding proximity zones; in response to receiving the request for the list of services, querying a plurality of hosts for performance metrics of respective services offered from the plurality of hosts, the respective services to be used by the application executing at the host; constructing a zone map, the zone map maintaining a mapping between the application and the plurality of hosts based on the performance metrics; and managing migration of the application or a service of the respective services to ensure a quality-of-service (QoS) of the application.

In Example 13, the subject matter of Example 12 includes, wherein a zone of the zone map is created based on an upper cost boundary and a lower cost boundary, the upper cost boundary representing a maximum cost for use of the respective services by the application.

In Example 14, the subject matter of Example 13 includes, wherein the upper cost boundary is represented by a threshold network latency.

In Example 15, the subject matter of Examples 13-14 includes, wherein the upper cost boundary is represented by a threshold network throughput.

In Example 16, the subject matter of Examples 13-15 includes, wherein the upper cost boundary is represented by a threshold processing completion time.

In Example 17, the subject matter of Examples 12-16 includes, wherein the request includes an input parameter to query the availability of a list of service instances with a certain scope of locality.

In Example 18, the subject matter of Examples 12-17 includes, wherein the request includes an input parameter to query the availability of a list of service instances that can be consumed only locally.

In Example 19, the subject matter of Examples 12-18 includes, wherein the request includes an input parameter to query the availability of a list of service instances that are executing at the host.

In Example 20, the subject matter of Examples 12-19 includes, wherein querying the plurality of hosts for performance metrics of respective services offered from the plurality of hosts includes interfacing with a second MEC system.

In Example 21, the subject matter of Example 20 includes, wherein interfacing with the second MEC system includes transmitting the query to a MEC orchestrator of the second MEC system, the MEC orchestrator configured to query hosts in the second MEC system for performance metrics of services available from the hosts of the second MEC system.

In Example 22, the subject matter of Examples 12-21 includes, wherein the plurality of hosts includes multi-access edge computing (MEC) hosts that operate according to a standard from an ETSI (European Telecommunications Standards Institute) MEC standards family.

Example 23 is at least one machine-readable medium including instructions, which when executed by a machine, cause the machine to perform operations of any of the methods of Examples 12-22.

Example 24 is an apparatus comprising means for performing any of the methods of Examples 12-22.

Example 25 is an apparatus for managing service consumption using zones, comprising: means for receiving, from an application executing at a host, a request for a list of services and corresponding proximity zones; in response to receiving the request for the list of services, querying a plurality of hosts for performance metrics of respective services offered from the plurality of hosts, the respective services to be used by the application executing at the host; means for constructing a zone map, the zone map maintaining a mapping between the application and the plurality of hosts based on the performance metrics; and means for managing migration of the application or a service of the respective services to ensure a quality-of-service (QoS) of the application.

In Example 26, the subject matter of Example 25 includes, wherein a zone of the zone map is created based on an upper cost boundary and a lower cost boundary, the upper cost boundary representing a maximum cost for use of the respective services by the application.

In Example 27, the subject matter of Example 26 includes, wherein the upper cost boundary is represented by a threshold network latency.

In Example 28, the subject matter of Examples 26-27 includes, wherein the upper cost boundary is represented by a threshold network throughput.

In Example 29, the subject matter of Examples 26-28 includes, wherein the upper cost boundary is represented by a threshold processing completion time.

In Example 30, the subject matter of Examples 25-29 includes, wherein the request includes an input parameter to query the availability of a list of service instances with a certain scope of locality.

In Example 31, the subject matter of Examples 25-30 includes, wherein the request includes an input parameter to query the availability of a list of service instances that can be consumed only locally.

In Example 32, the subject matter of Examples 25-31 includes, wherein the request includes an input parameter to query the availability of a list of service instances that are executing at the host.

In Example 33, the subject matter of Examples 25-32 includes, wherein the means for querying the plurality of hosts for performance metrics of respective services offered from the plurality of hosts includes means for interfacing with a second MEC system.

In Example 34, the subject matter of Example 33 includes, wherein the means for interfacing with the second MEC system includes means for transmitting the query to a MEC orchestrator of the second MEC system, the MEC orchestrator configured to query hosts in the second MEC system for performance metrics of services available from the hosts of the second MEC system.

In Example 35, the subject matter of Examples 25-34 includes, wherein the plurality of hosts includes multi-access edge computing (MEC) hosts that operate according to a standard from an ETSI (European Telecommunications Standards Institute) MEC standards family.

Example 36 is at least one machine-readable medium including instructions for managing service consumption using zones, the instructions when executed by a machine, cause the machine to perform the operations comprising: receiving, from an application executing at a host, a request for a list of services and corresponding proximity zones; in response to receiving the request for the list of services, querying a plurality of hosts for performance metrics of respective services offered from the plurality of hosts, the respective services to be used by the application executing at the host; constructing a zone map, the zone map maintaining a mapping between the application and the plurality of hosts based on the performance metrics; and managing migration of the application or a service of the respective services to ensure a quality-of-service (QoS) of the application.

In Example 37, the subject matter of Example 36 includes, wherein a zone of the zone map is created based on an upper cost boundary and a lower cost boundary, the upper cost boundary representing a maximum cost for use of the respective services by the application.

In Example 38, the subject matter of Example 37 includes, wherein the upper cost boundary is represented by a threshold network latency.

In Example 39, the subject matter of Examples 37-38 includes, wherein the upper cost boundary is represented by a threshold network throughput.

In Example 40, the subject matter of Examples 37-39 includes, wherein the upper cost boundary is represented by a threshold processing completion time.

In Example 41, the subject matter of Examples 36-40 includes, wherein the request includes an input parameter to query the availability of a list of service instances with a certain scope of locality.

In Example 42, the subject matter of Examples 36-41 includes, wherein the request includes an input parameter to query the availability of a list of service instances that can be consumed only locally.

In Example 43, the subject matter of Examples 36-42 includes, wherein the request includes an input parameter to query the availability of a list of service instances that are executing at the host.

In Example 44, the subject matter of Examples 36-43 includes, wherein querying the plurality of hosts for performance metrics of respective services offered from the plurality of hosts includes interfacing with a second MEC system.

In Example 45, the subject matter of Example 44 includes, wherein interfacing with the second MEC system includes transmitting the query to a MEC orchestrator of the second MEC system, the MEC orchestrator configured to query hosts in the second MEC system for performance metrics of services available from the hosts of the second MEC system.

In Example 46, the subject matter of Examples 36-45 includes, wherein the plurality of hosts includes multi-access edge computing (MEC) hosts that operate according to a standard from an ETSI (European Telecommunications Standards Institute) MEC standards family.

Example 47 is at least one machine-readable medium including instructions that, when executed by processing circuitry, cause the processing circuitry to perform operations to implement of any of Examples 1-46.

Example 48 is an apparatus comprising means to implement of any of Examples 1-46.

Example 49 is a system to implement of any of Examples 1-46.

Example 50 is a method to implement of any of Examples 1-46.

Example 47 may include one or more non-transitory computer-readable media comprising instructions to cause an electronic device, upon execution of the instructions by one or more processors of the electronic device, to perform one or more elements of a method described in or related to any of examples 1-46, or any other method or process described herein.

Example 48 may include an apparatus comprising logic, modules, or circuitry to perform one or more elements of a method described in or related to any of examples 1-46, or any other method or process described herein.

Example 49 may include a method, technique, or process as described in or related to any of examples 1-46, or portions or parts thereof.

Example 50 may include an apparatus comprising: one or more processors and one or more computer readable media comprising instructions that, when executed by the one or more processors, cause the one or more processors to perform the method, techniques, or process as described in or related to any of examples 1-46, or portions thereof.

Example 51 may include a signal as described in or related to any of examples 1-46, or portions or parts thereof.

Example 52 may include a signal in a wireless network as described in or related to any of examples 1-46, or as otherwise shown and described herein.

Example 53 may include a method of communicating in a wireless network as described in or related to any of examples 1-46, or as otherwise shown and described herein.

Example 54 may include a system for providing wireless communication as described in or related to any of examples 1-46, or as otherwise shown and described herein.

Example 55 may include a device for providing wireless communication as described in or related to any of examples 1-46, or as otherwise shown and described herein.

Example 56 is a network comprising respective devices and device communication mediums for performing any of the operations of examples 1-46, or as otherwise shown and described herein.

Example 57 is an 4G/5G communications network topology, the network topology comprising respective communication links adapted to perform communications for the operations of any of examples 1-46, or as otherwise shown and described herein.

Example 58 is an edge cloud computing device implementation comprising processing nodes and computing units adapted for performing any of the operations of examples 1-46, or as otherwise shown and described herein.

Example 59 is an ETSI MEC system implementation comprising devices, processing nodes, and computing units adapted for performing any of the operations of examples 1-46, or as otherwise shown and described herein.

Example 60 is a MEC system implementation, including respective MEC entities including MEC hosts, MEC platforms, orchestrator, adapted for performing any of the operations of examples 1-46, or as otherwise shown and described herein.

Example 61 is an edge cloud network platform comprising physical and logical computing resources adapted for performing any of the operations of examples 1-46, or as otherwise shown and described herein.

Example 62 is an apparatus comprising respective means for performing any of the operations of examples 1-46, or as otherwise shown and described herein.

Example 63 is a system to perform the operations of any of examples 1-46, or as otherwise shown and described herein.

Example 64 is at least one machine-readable storage medium, comprising information representative of instructions that, when executed by processing circuitry, cause the processing circuitry to, perform the operations of any of examples 1-46.

In the above Detailed Description, various features may be grouped together to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An apparatus operating as a multi-access edge computing (MEC) orchestrator to manage services consumption using zones, comprising:
   processing circuitry; and
   a memory device including instructions embodied thereon, wherein the instructions, which when executed by the processing circuitry, configure the processing circuitry to perform operations to:
      receive, from an application executing at a local host, a request for a list of services and corresponding proximity zones, the local host being under orchestration control of the MEC orchestrator;
      in response to receiving the request for the list of services, transmit a query to a plurality of remote hosts under orchestration control of the MEC orchestrator for performance metrics of respective services offered from the plurality of remote hosts, the respective services to be used by the application executing at the local host;
      construct a zone map including a plurality of zones that are stratified by performance cost boundaries, the performance cost boundaries indicating threshold performance metrics for a zone of the plurality of zones, the zone map comprising multiple zones, with each zone of the multiple zones enumerated as: a zone identifier, a cost range defined using a lower performance cost boundary and an upper performance cost boundary, a local host identifier of the local host executing the application, and a remote host identifier of each the plurality of remote hosts that provide respective services to be used by the application executing at the local host; and
      manage migration of the application or a service of the respective services, based on the zone map, to ensure a quality-of-service (QoS) of the application.

2. The apparatus of claim 1, wherein the performance upper cost boundary is represented by a threshold network latency.

3. The apparatus of claim 1, wherein the performance upper cost boundary is represented by a threshold network throughput.

4. The apparatus of claim 1, wherein the performance upper cost boundary is represented by a threshold processing completion time.

5. The apparatus of claim 1, wherein the request includes an input parameter to query the availability of a list of service instances with a scope of locality.

6. The apparatus of claim 1, wherein the request includes an input parameter to query the availability of a list of service instances that can be consumed only locally.

7. The apparatus of claim 1, wherein the request includes an input parameter to query the availability of a list of service instances that are executing at the local host.

8. The apparatus of claim 1, wherein to query the plurality of remote hosts for performance metrics of respective services offered from the plurality of remote hosts, the apparatus performs operations to interface with a second MEC system.

9. The apparatus of claim 8, wherein to interface with the second MEC system, the apparatus performs operations to transmit the query to a MEC orchestrator of the second MEC system, the MEC orchestrator configured to query remote hosts in the second MEC system for performance metrics of services available from the remote hosts of the second MEC system.

10. The apparatus of claim 1, wherein the local host and the plurality of remote hosts includes multi-access edge computing (MEC) hosts that operate according to a standard from an ETSI (European Telecommunications Standards Institute) MEC standards family.

11. A method for managing service consumption using zones, comprising:
   receiving, at a MEC orchestrator from an application executing at a local host, a request for a list of services and corresponding proximity zones, the local host being under orchestration control of the MEC orchestrator;
   in response to receiving the request for the list of services, transmitting a query to a plurality of remote hosts under orchestration control of the MEC orchestrator for performance metrics of respective services offered from the plurality of remote hosts, the respective services to be used by the application executing at the local host;

constructing a zone map including a plurality of zones that are stratified by performance cost boundaries, the performance cost boundaries indicating threshold performance metrics for a zone of the plurality of zones, the zone map comprising multiple zones, with each zone of the multiple zones enumerated as: a zone identifier, a cost range defined using a lower performance cost boundary and an upper performance cost boundary, a local host identifier of the local host executing the application, and a remote host identifier of each the plurality of remote hosts that provide respective services to be used by the application executing at the local host; and managing migration of the application or a service of the respective services to ensure a quality-of-service (QoS) of the application.

12. The method of claim 11, wherein the request includes an input parameter to query the availability of a list of service instances that can be consumed only locally.

13. The method of claim 11, wherein the request includes an input parameter to query the availability of a list of service instances that are executing at the local host.

14. The method of claim 11, comprising querying the plurality of remote hosts for performance metrics of respective services offered from the plurality of remote hosts includes interfacing with a second MEC system.

15. At least one non-transitory machine-readable medium including instructions for managing service consumption using zones, the instructions when executed by a machine, cause the machine to perform the operations comprising:

receiving, at a MEC orchestrator from an application executing at a local host, a request for a list of services and corresponding proximity zones, the local host being under orchestration control of the MEC orchestrator;

in response to receiving the request for the list of services, transmitting a query to a plurality of remote hosts under orchestration control of the MEC orchestrator for performance metrics of respective services offered from the plurality of remote hosts, the respective services to be used by the application executing at the local host;

constructing a zone map including a plurality of zones that are stratified by performance cost boundaries, the performance cost boundaries indicating threshold performance metrics for a zone of the plurality of zones, the zone map comprising multiple zones, with each zone of the multiple zones enumerated as: a zone identifier, a cost range defined using a lower performance cost boundary and an upper performance cost boundary, a local host identifier of the local host executing the application, and a remote host identifier of each the plurality of remote hosts that provide respective services to be used by the application executing at the local host; and managing migration of the application or a service of the respective services to ensure a quality-of-service (QoS) of the application.

16. The at least one non-transitory machine-readable medium of claim 15, wherein querying the plurality of remote hosts for performance metrics of respective services offered from the plurality of remote hosts includes interfacing with a second MEC system.

17. The at least one non-transitory machine-readable medium of claim 16, wherein interfacing with the second MEC system includes transmitting the query to a MEC orchestrator of the second MEC system, the MEC orchestrator configured to query remote hosts in the second MEC system for performance metrics of services available from the remote hosts of the second MEC system.

* * * * *